US010534175B2

(12) United States Patent
Yeoh et al.

(10) Patent No.: US 10,534,175 B2
(45) Date of Patent: Jan. 14, 2020

(54) WAVELENGTH MULTIPLEXING IN WAVEGUIDES

(71) Applicant: Magic Leap, Inc., Plantation, FL (US)

(72) Inventors: Ivan L. Yeoh, Fort Lauderdale, FL (US); Lionel E. Edwin, Hollywood, FL (US); John Graham Macnamara, Plantation, FL (US)

(73) Assignee: Magic Leap, Inc., Plantation, FL (US)

( * ) Notice: Subject to any disclaimer, the term of this patent is extended or adjusted under 35 U.S.C. 154(b) by 29 days.

(21) Appl. No.: 15/591,668

(22) Filed: May 10, 2017

(65) Prior Publication Data

US 2017/0329075 A1 Nov. 16, 2017

Related U.S. Application Data

(60) Provisional application No. 62/335,223, filed on May 12, 2016, provisional application No. 62/335,232, filed on May 12, 2016.

(51) Int. Cl.
*G02B 27/01* (2006.01)
*F21V 8/00* (2006.01)
*G02B 6/34* (2006.01)

(52) U.S. Cl.
CPC ......... *G02B 27/0172* (2013.01); *G02B 6/005* (2013.01); *G02B 6/0016* (2013.01); *G02B 6/0026* (2013.01); *G02B 6/0031* (2013.01); *G02B 6/0035* (2013.01); *G02B 6/0056* (2013.01); *G02B 6/0083* (2013.01); *G02B 6/0076* (2013.01); *G02B 6/34* (2013.01); *G02B 2027/0112* (2013.01); *G02B 2027/0125* (2013.01); *G02B 2027/0174* (2013.01); *G02B 2027/0178* (2013.01)

(58) Field of Classification Search
CPC ................ G02B 27/0172; G02B 6/0016; G02B 6/0035; G02B 6/0031; G02B 6/0076; G02B 6/005; G02B 6/0083; G02B 6/0056; G02B 6/0026; G02B 2027/0174; G02B 2027/0112; G02B 2027/0178; G02B 2027/0125
USPC ...................................................... 359/13, 34
See application file for complete search history.

(56) References Cited

U.S. PATENT DOCUMENTS 8,950,867 B2    2/2015  Macnamara
9,215,293 B2   12/2015  Miller
(Continued)

OTHER PUBLICATIONS

International Search Report and Written Opinion for PCT Application No. PCT/US17/32013, dated Sep. 14, 2017.
(Continued)

*Primary Examiner* — Jade R Chwasz
(74) *Attorney, Agent, or Firm* — Knobbe, Martens, Olson & Bear, LLP

(57) ABSTRACT

A stacked waveguide assembly can have multiple waveguide stacks. Each waveguide stack can include a plurality of waveguides, where a first waveguide stack may be associated with a first subcolor of each of three different colors, and a second waveguide stack may be associated with a second subcolor of each of the three different colors. For example, the first stack of waveguides can incouple blue, green, and red light at 440 nm, 520 nm, and 650 nm, respectively. The second stack of waveguides can incouple blue, green, and red light at 450 nm, 530 nm, and 660 nm, respectively.

8 Claims, 18 Drawing Sheets

(56) References Cited

U.S. PATENT DOCUMENTS

| | | |
|---|---|---|
| 9,310,559 B2 | 4/2016 | Macnamara |
| 9,348,143 B2 | 5/2016 | Gao et al. |
| D758,367 S | 6/2016 | Natsume |
| 9,417,452 B2 | 8/2016 | Schowengerdt et al. |
| 2002/0126384 A1 | 9/2002 | Petrov et al. |
| 2005/0275818 A1 | 12/2005 | Singer |
| 2008/0309996 A1 | 12/2008 | Cowan |
| 2013/0082922 A1 | 4/2013 | Miller |
| 2013/0125027 A1 | 5/2013 | Abovitz |
| 2014/0003762 A1 | 1/2014 | Macnamara |
| 2014/0071539 A1 | 3/2014 | Gao |
| 2014/0177023 A1 | 6/2014 | Gao et al. |
| 2014/0218468 A1 | 8/2014 | Gao et al. |
| 2014/0233879 A1 | 8/2014 | Gibson et al. |
| 2014/0306866 A1 | 10/2014 | Miller et al. |
| 2015/0002528 A1* | 1/2015 | Bohn ............... G02B 27/0172 345/589 |
| 2015/0016777 A1 | 1/2015 | Abovitz et al. |
| 2015/0103306 A1 | 4/2015 | Kaji et al. |
| 2015/0178939 A1 | 6/2015 | Bradski et al. |
| 2015/0205126 A1 | 7/2015 | Schowengerdt |
| 2015/0222883 A1 | 8/2015 | Welch |
| 2015/0222884 A1 | 8/2015 | Cheng |
| 2015/0247976 A1 | 9/2015 | Abovitz et al. |
| 2015/0268415 A1 | 9/2015 | Schowengerdt et al. |
| 2015/0302652 A1 | 10/2015 | Miller et al. |
| 2015/0346490 A1 | 12/2015 | TeKolste et al. |
| 2015/0346495 A1 | 12/2015 | Welch et al. |
| 2016/0011419 A1 | 1/2016 | Gao |
| 2016/0026253 A1 | 1/2016 | Bradski et al. |
| 2016/0085300 A1 | 3/2016 | Robbins et al. |
| 2016/0116739 A1 | 4/2016 | TeKolste et al. |
| 2017/0010466 A1 | 1/2017 | Klug et al. |
| 2017/0010488 A1 | 1/2017 | Klug et al. |

OTHER PUBLICATIONS

International Search Report and Written Opinion for PCT Application No. PCT/US17/31989, dated Sep. 15, 2017.
Invitation to Pay Additional Fees for PCT Application No. PCT/US17/32013, dated Jul. 18, 2017.
Invintation to Pay Additional Fees for PCT Application No. PCT/US17/31989, dated Jul. 20, 2017.

* cited by examiner

WAVELENGTH MULTIPLEXING IN WAVEGUIDES

CROSS-REFERENCE TO RELATED APPLICATIONS

This application claims the benefit of priority under 35 U.S.C. § 119(e) to U.S. Provisional Application No. 62/335,223, filed on May 12, 2016, entitled "DISTRIBUTED LIGHT MANIPULATION OVER IMAGING WAVEGUIDE," and to U.S. Provisional Application No. 62/335,232, filed on May 12, 2016, entitled "WAVELENGTH MULTIPLEXING IN WAVEGUIDES," both of which are hereby incorporated by reference herein in their entirety.

FIELD

The present disclosure relates to virtual reality and augmented reality imaging and visualization systems and more particularly to distributing light to different regions of a waveguide.

BACKGROUND

Modern computing and display technologies have facilitated the development of systems for so called "virtual reality" or "augmented reality" experiences, wherein digitally reproduced images or portions thereof are presented to a user in a manner wherein they seem to be, or may be perceived as, real. A virtual reality, or "VR", scenario typically involves presentation of digital or virtual image information without transparency to other actual real-world visual input; an augmented reality, or "AR", scenario typically involves presentation of digital or virtual image information as an augmentation to visualization of the actual world around the user. For example, referring to FIG. 1, an augmented reality scene 1000 is depicted wherein a user of an AR technology sees a real-world park-like setting 1100 featuring people, trees, buildings in the background, and a concrete platform 1120. In addition to these items, the user of the AR technology also perceives that he "sees" a robot statue 1110 standing upon the real-world platform 1120, and a cartoon-like avatar character 1130 flying by which seems to be a personification of a bumble bee, even though these elements do not exist in the real world. As it turns out, the human visual perception system is very complex, and producing a VR or AR technology that facilitates a comfortable, natural-feeling, rich presentation of virtual image elements amongst other virtual or real-world imagery elements is challenging. Systems and methods disclosed herein address various challenges related to VR and AR technology.

SUMMARY

Examples of waveguides and stacked waveguide assemblies that can be used in wearable display systems are described herein.

An embodiment of a waveguide comprises an incoupling optical element, configured to incouple light at a first wavelength and to couple light out of the waveguide that is not at the first wavelength. The waveguide further comprises a wavelength selective region, where the wavelength selective region is configured to receive the incoupled light from the incoupling optical element and to propagate the incoupled light to a light distributing element. The wavelength selective region can be configured to attenuate the incoupled light not at the first wavelength relative to incoupled light at the first wavelength. The light distributing element can be configured to couple the incoupled light at the first wavelength out of the wavelength selective region. The waveguide also comprises an outcoupling optical element configured to receive the incoupled light at the first wavelength from the light distributing element and to couple the incoupled light at the first wavelength out of the waveguide.

An embodiment of a stacked waveguide assembly comprises a first waveguide, which comprises a first incoupling optical element that is configured to incouple light at a first wavelength and to couple light not at the first wavelength out of the first waveguide. The first waveguide further comprises a first wavelength selective region that is configured to receive incoupled light from the first incoupling optical element and to propagate the incoupled light to a first light distributing element. The first wavelength selective region is configured to attenuate the incoupled light not at the first wavelength relative to incoupled light at the first wavelength and to couple the incoupled light at the first wavelength out of the first wavelength selective region. The first waveguide also comprises a first outcoupling optical element that is configured to receive the incoupled light at the first wavelength from the first light distributing element and to couple the incoupled light not at the first wavelength out of the first waveguide.

The embodiment of the stacked waveguide assembly further comprises a second waveguide, which comprises a second incoupling optical element that is configured to receive incident light at a second wavelength different from the first wavelength from the first incoupling optical element, to couple incident light not at the second wavelength out of the second waveguide, and to incouple the incident light at the second wavelength. The second waveguide further comprises a second wavelength selective region that is configured to receive incoupled light from the second incoupling optical element and to propagate the incoupled light to a second light distributing element. The second wavelength selective region is configured to attenuate the incoupled light not at the second wavelength relative to incoupled light at the second wavelength. The second light distributing element is configured to couple the incoupled light at the second wavelength out of the second wavelength selective region. The second waveguide also comprises a second outcoupling optical element that is configured to receive the incoupled light at the second wavelength from the second light distributing element and to couple the incoupled light not at the second wavelength out of the second waveguide.

An embodiment of a method of displaying an optical image comprises incoupling light having a first wavelength and a second wavelength different from the first wavelength into a stacked waveguide assembly. The stacked waveguide assembly comprises a first waveguide and a second waveguide, wherein the first waveguide comprises a first layer of a wavelength selective region and a first layer of an outcoupling optical element. The second waveguide comprises a second layer of the wavelength selective region and a second layer of the outcoupling optical element. The method further comprises selectively attenuating the incoupled light at the second wavelength relative to the first wavelength in the first layer of the wavelength selective region and selectively attenuating the incoupled light at the first wavelength relative to the first wavelength in the second layer of the wavelength selective region. The method further comprises coupling the incoupled light at the first wavelength to the first layer of the outcoupling optical element and coupling the incoupled light at the first wavelength to the second layer of the outcoupling optical element. The method also comprises coupling the incoupled light at the first wavelength and the second wavelength out of the stacked waveguide assembly.

Another embodiment of a method of displaying an optical image comprises incoupling light having a first wavelength and a second wavelength different from the first wavelength into a waveguide and selectively attenuating the incoupled light at the second wavelength relative to the first wavelength in a first layer of a wavelength selective region. The method further comprises selectively attenuating the incoupled light at the first wavelength relative to the second wavelength in a second layer of the wavelength selective region and coupling the incoupled light at the first wavelength from a first light distributing element to a first layer of an outcoupling optical element. The method further comprises coupling the incoupled light at the second wavelength from a second light distributing element to a second layer of the outcoupling optical element and coupling the incoupled light at the first wavelength and second wavelength out of the outcoupling optical element.

Details of one or more implementations of the subject matter described in this specification are set forth in the accompanying drawings and the description below. Other features, aspects, and advantages will become apparent from the description, the drawings, and the claims. Neither this summary nor the following detailed description purports to define or limit the scope of the inventive subject matter.

Throughout the drawings, reference numbers may be re-used to indicate correspondence between referenced elements. The drawings are provided to illustrate example embodiments described herein and are not intended to limit the scope of the disclosure.

DETAILED DESCRIPTION

Overview

In order for a three-dimensional (3D) display to produce a true sensation of depth, and more specifically, a simulated sensation of surface depth, it is desirable for each point in the display's visual field to generate the accommodative response corresponding to its virtual depth. If the accommodative response to a display point does not correspond to the virtual depth of that point, as determined by the binocular depth cues of convergence and stereopsis, the human eye may experience an accommodation conflict, resulting in unstable imaging, harmful eye strain, headaches, and, in the absence of accommodation information, almost a complete lack of surface depth.

VR and AR experiences can be provided by display systems having displays in which images corresponding to a plurality of depth planes are provided to a viewer. The images may be different for each depth plane (e.g., provide slightly different presentations of a scene or object) and may be separately focused by the viewer's eyes, thereby helping to provide the user with depth cues based on the accommodation of the eye required to bring into focus different image features for the scene located on different depth plane and/or based on observing different image features on different depth planes being out of focus. As discussed elsewhere herein, such depth cues provide credible perceptions of depth.

Figure 1:
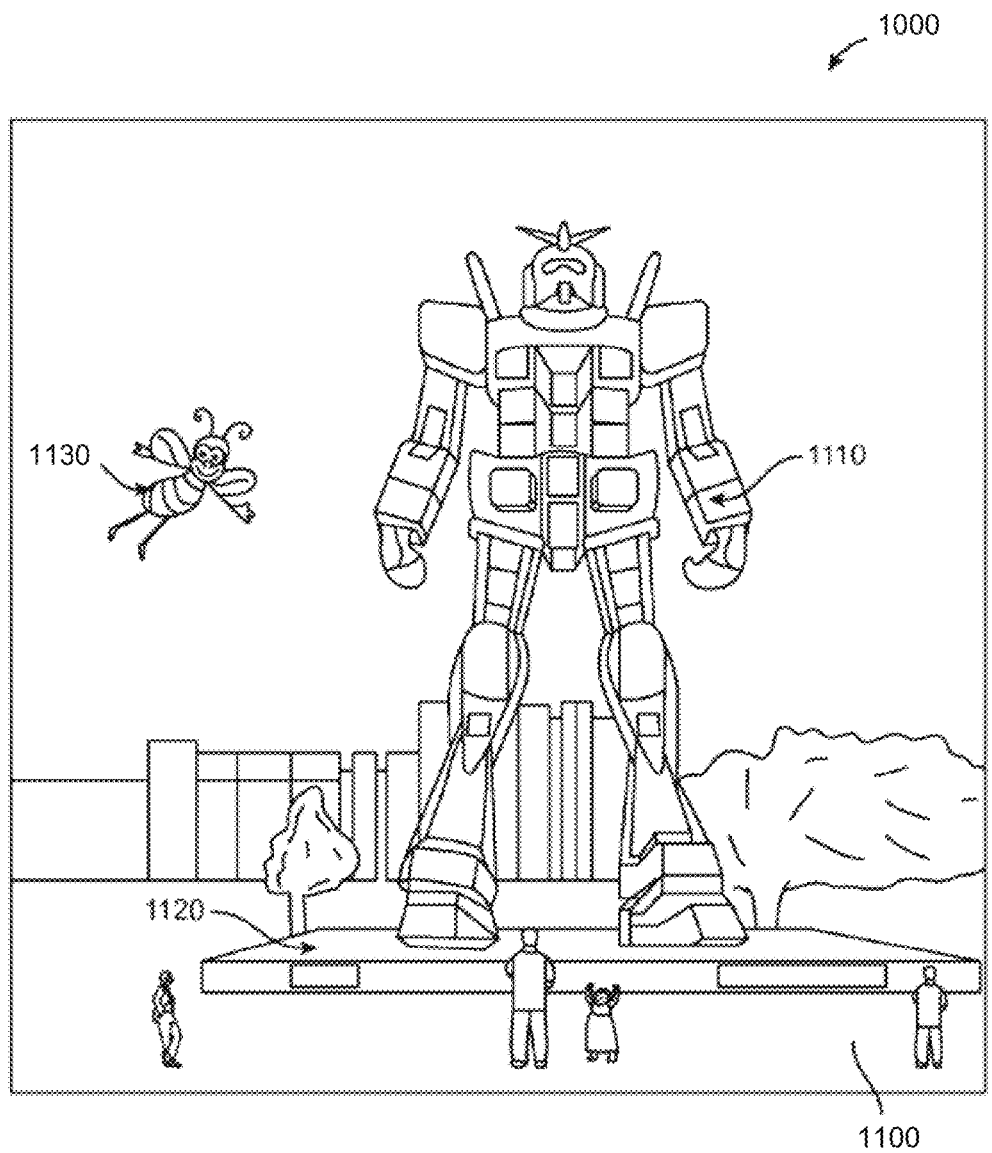
FIG. 1 depicts an illustration of an augmented reality scenario with certain virtual reality objects, and certain actual reality objects viewed by a person.
Figure 2:
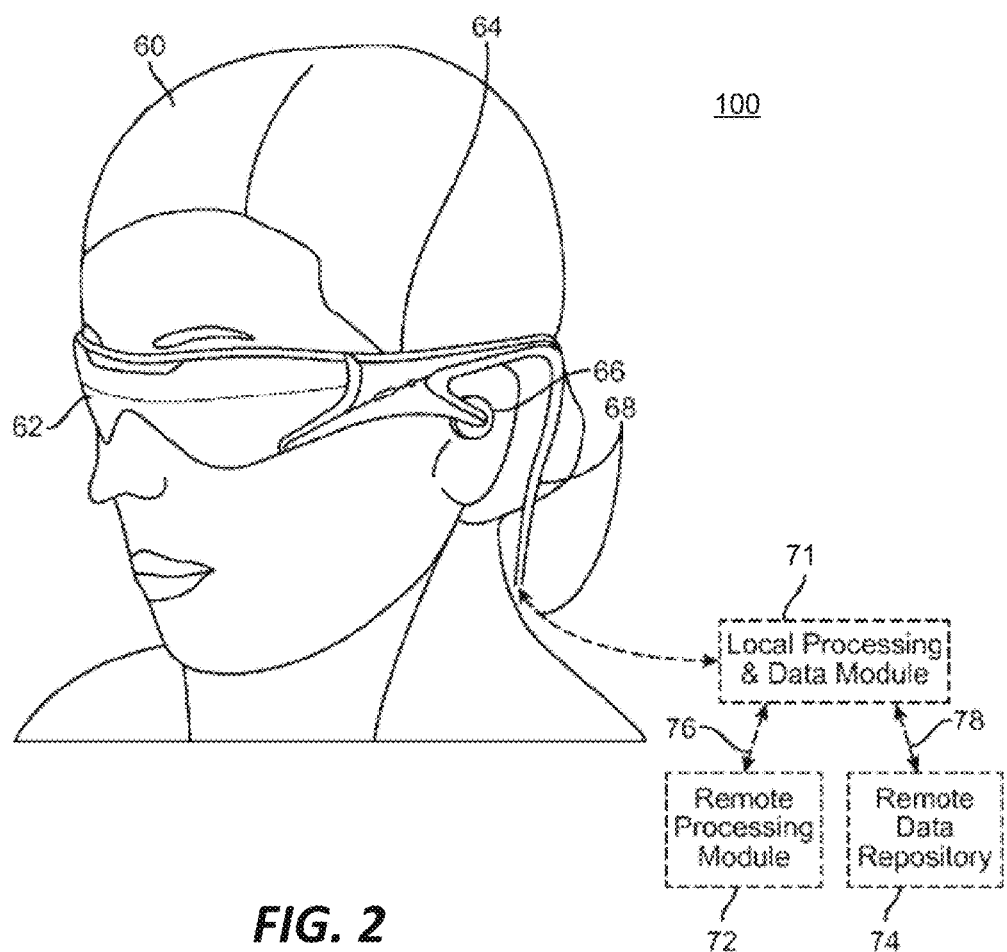
FIG. 2 schematically illustrates an example of a wearable display system.

FIG. 2 illustrates an example of wearable display system 100. The display system 100 includes a display 62, and various mechanical and electronic modules and systems to support the functioning of display 62. The display 62 may be coupled to a frame 64, which is wearable by a display system user, wearer, or viewer 60 and which is configured to position the display 62 in front of the eyes of the user 60. In some embodiments, a speaker 66 is coupled to the frame 64 and positioned adjacent the ear canal of the user (in some embodiments, another speaker, not shown, is positioned adjacent the other ear canal of the user to provide for stereo/shapeable sound control). The display 62 is operatively coupled 68, such as by a wired lead or wireless connectivity, to a local data processing module 71 which may be mounted in a variety of configurations, such as fixedly attached to the frame 64, fixedly attached to a helmet or hat worn by the user, embedded in headphones, or otherwise removably attached to the user 60 (e.g., in a backpack-style configuration, in a belt-coupling style configuration).

The local processing and data module 71 may comprise a hardware processor, as well as digital memory, such as non-volatile memory (e.g., flash memory), both of which may be utilized to assist in the processing, caching, and storage of data. The data may include data a) captured from sensors (which may be, e.g., operatively coupled to the frame 64 or otherwise attached to the user 60), such as image capture devices (e.g., cameras), microphones, inertial measurement units, accelerometers, compasses, global positioning system (GPS) units, radio devices, and/or gyroscopes; and/or b) acquired and/or processed using remote processing module 72 and/or remote data repository 74, possibly for passage to the display 62 after such processing or retrieval. The local processing and data module 71 may be operatively coupled by communication links 76 and/or 78, such as via wired or wireless communication links, to the remote processing module 72 and/or remote data repository 74 such that these remote modules are available as resources to the local processing and data module 71. In addition, remote processing module 72 and remote data repository 74 may be operatively coupled to each other.

In some embodiments, the remote processing module 72 may comprise one or more processors configured to analyze and process data and/or image information. In some embodiments, the remote data repository 74 may comprise a digital data storage facility, which may be available through the internet or other networking configuration in a "cloud" resource configuration. In some embodiments, all data is stored and all computations are performed in the local processing and data module, allowing fully autonomous use from a remote module.

The human visual system is complicated and providing a realistic perception of depth is challenging. Without being limited by theory, it is believed that viewers of an object may perceive the object as being three-dimensional due to a combination of vergence and accommodation. Vergence movements (e.g., rotational movements of the pupils toward or away from each other to converge the lines of sight of the eyes to fixate upon an object) of the two eyes relative to each other are closely associated with focusing (or "accommodation") of the lenses of the eyes. Under normal conditions, changing the focus of the lenses of the eyes, or accommodating the eyes, to change focus from one object to another object at a different distance will automatically cause a matching change in vergence to the same distance, under a relationship known as the "accommodation-vergence reflex." Likewise, a change in vergence will trigger a matching change in accommodation, under normal conditions. Display systems that provide a better match between accommodation and vergence may form more realistic or comfortable simulations of three-dimensional imagery.

Figure 3:
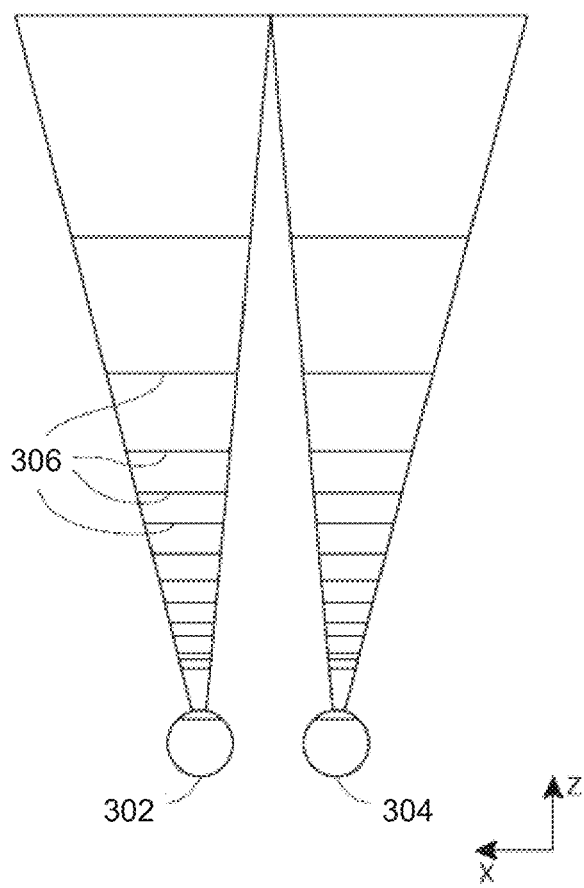
FIG. 3 schematically illustrates aspects of an approach for simulating three-dimensional imagery using multiple depth planes.

FIG. 3 illustrates aspects of an approach for simulating three-dimensional imagery using multiple depth planes. With reference to FIG. 3, objects at various distances from eyes 302 and 304 on the z-axis are accommodated by the eyes 302 and 304 so that those objects are in focus. The eyes 302 and 304 assume particular accommodated states to bring into focus objects at different distances along the z-axis. Consequently, a particular accommodated state may be said to be associated with a particular one of depth planes 306, with has an associated focal distance, such that objects or parts of objects in a particular depth plane are in focus when the eye is in the accommodated state for that depth plane. In some embodiments, three-dimensional imagery may be simulated by providing different presentations of an image for each of the eyes 302 and 304, and also by providing different presentations of the image corresponding to each of the depth planes. While shown as being separate for clarity of illustration, the fields of view of the eyes 302 and 304 may overlap, for example, as distance along the z-axis increases. In addition, while shown as flat for ease of illustration, the contours of a depth plane may be curved in physical space, such that all features in a depth plane are in focus with the eye in a particular accommodated state. Without being limited by theory, it is believed that the human eye typically can interpret a finite number of depth planes to provide depth perception. Consequently, a highly believable simulation of perceived depth may be achieved by providing, to the eye, different presentations of an image corresponding to each of these limited number of depth planes.

Waveguide Stack Assembly

Figure 4:
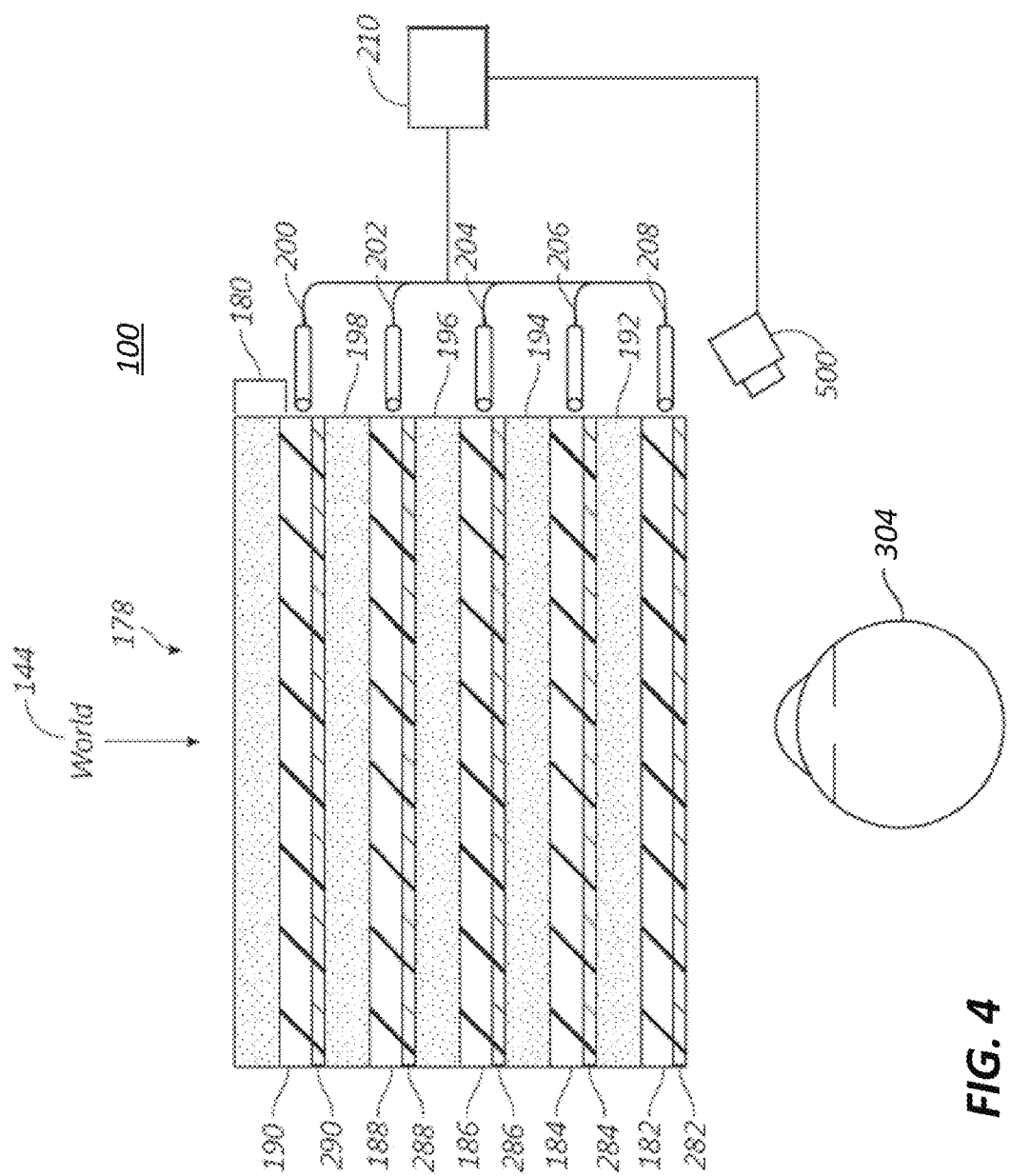
FIG. 4 schematically illustrates an example of a waveguide stack for outputting image information to a user.

FIG. 4 illustrates an example of a waveguide stack for outputting image information to a user. A display system 100 includes a stack of waveguides, or stacked waveguide assembly, 178 that may be utilized to provide three-dimensional perception to the eye/brain using a plurality of waveguides 182, 184, 186, 188, 190. In some embodiments, the display system 100 shown in FIG. 4 may be used in the wearable display system 100 shown in FIG. 2, with FIG. 4 schematically showing some parts of that system 100 in greater detail. For example, in some embodiments, the waveguide assembly 178 may be integrated into the display 62 of FIG. 2.

With continued reference to FIG. 4, the waveguide assembly 178 may also include a plurality of features 198, 196, 194, 192 between the waveguides. In some embodiments, the features 198, 196, 194, 192 may be lenses. The waveguides 182, 184, 186, 188, 190 and/or the plurality of lenses 198, 196, 194, 192 may be configured to send image information to the eye with various levels of wavefront curvature or light ray divergence. Each waveguide level may be associated with a particular depth plane and may be configured to output image information corresponding to that depth plane. Image injection devices 200, 202, 204, 206, 208 may be utilized to inject image information into the waveguides 182, 184, 186, 188, 190, each of which may be configured to distribute incoming light across each respective waveguide, for output toward the eye 304. Light exits an output surface of the image injection devices 200, 202, 204, 206, 208 and is injected into a corresponding input edge of the waveguides 182, 184, 186, 188, 190. In some embodiments, a single beam of light (e.g., a collimated beam) is be injected into each waveguide to output an entire field of cloned collimated beams that are directed toward the eye 304 at particular angles (and amounts of divergence) corresponding to the depth plane associated with a particular waveguide.

In some embodiments, the image injection devices 200, 202, 204, 206, 208 are discrete displays that each produce image information for injection into a corresponding waveguide 182, 184, 186, 188, 190, respectively. In some other embodiments, the image injection devices 200, 202, 204, 206, 208 are the output ends of a single multiplexed display which may, e.g., pipe image information via one or more optical conduits (such as fiber optic cables) to each of the image injection devices 200, 202, 204, 206, 208.

A controller 210 controls the operation of the stacked waveguide assembly 178 and the image injection devices 200, 202, 204, 206, 208. In some embodiments, the controller 210 includes programming (e.g., instructions in a non-transitory computer-readable medium) that regulates the timing and provision of image information to the waveguides 182, 184, 186, 188, 190. In some embodiments, the controller is be a single integral device (e.g., a hardware processor), or a distributed system connected by wired or wireless communication channels. The controller 210 is part of the processing modules 71 or 72 (illustrated in FIG. 2) in some embodiments.

The waveguides 182, 184, 186, 188, 190 may be configured to propagate light within each respective waveguide by total internal reflection (TIR). The waveguides 182, 184, 186, 188, 190 may each be planar or have another shape (e.g., curved), with major top and bottom surfaces and edges extending between those major top and bottom surfaces. In the illustrated configuration, the waveguides 182, 184, 186, 188, 190 may each include light extracting optical elements 282, 284, 286, 288, 290 that are configured to extract light out of a waveguide by redirecting the light, propagating within each respective waveguide, out of the waveguide to output image information to the eye 304. Extracted light may also be referred to as outcoupled light, and light extracting optical elements may also be referred to as outcoupling optical elements. An extracted beam of light is outputted by the waveguide at locations at which the light propagating in the waveguide strikes a light redirecting element. The light extracting optical elements 82, 284, 286, 288, 290 may, for example, be reflective and/or diffractive optical features. While illustrated disposed at the bottom surfaces of the waveguides 182, 184, 186, 188, 190 for ease of description and drawing clarity, in some embodiments, the light extracting optical elements 282, 284, 286, 288, 290 are disposed at the top and/or bottom surfaces, and/or may be disposed directly in the volume of the waveguides 182, 184, 186, 188, 190. In some embodiments, the light extracting optical elements 282, 284, 286, 288, 290 are formed in a layer of material that is attached to a transparent substrate to form the waveguides 182, 184, 186, 188, 190. In some other embodiments, the waveguides 182, 184, 186, 188, 190 are a monolithic piece of material and the light extracting optical elements 282, 284, 286, 288, 290 may be formed on a surface and/or in the interior of that piece of material.

With continued reference to FIG. 4, as discussed herein, each waveguide 182, 184, 186, 188, 190 is configured to output light to form an image corresponding to a particular depth plane. For example, the waveguide 182 nearest the eye may be configured to deliver collimated light, as injected into such waveguide 182, to the eye 304. The collimated light may be representative of the optical infinity focal plane. The next waveguide up 184 may be configured to send out collimated light which passes through the first lens 192 (e.g., a negative lens) before it can reach the eye 304. First lens 192 may be configured to create a slight convex wavefront curvature so that the eye/brain interprets light coming from that next waveguide up 184 as coming from a first focal plane closer inward toward the eye 304 from optical infinity. Similarly, the third up waveguide 186 passes its output light through both the first lens 192 and second lens 194 before reaching the eye 304. The combined optical power of the first and second lenses 192 and 194 may be configured to create another incremental amount of wavefront curvature so that the eye/brain interprets light coming from the third waveguide 186 as coming from a second focal plane that is even closer inward toward the person from optical infinity than was light from the next waveguide up 184.

The other waveguide layers (e.g., waveguides 188, 190) and lenses (e.g., lenses 196, 198) are similarly configured, with the highest waveguide 190 in the stack sending its output through all of the lenses between it and the eye for an aggregate focal power representative of the closest focal plane to the person. To compensate for the stack of lenses 198, 196, 194, 192 when viewing/interpreting light coming from the world 144 on the other side of the stacked waveguide assembly 178, a compensating lens layer 180 may be disposed at the top of the stack to compensate for the aggregate power of the lens stack 198, 196, 194, 192 below. Such a configuration provides as many perceived focal planes as there are available waveguide/lens pairings. Both the light extracting optical elements of the waveguides and the focusing aspects of the lenses may be static (e.g., not dynamic or electro-active). In some alternative embodiments, either or both are dynamic using electro-active features.

With continued reference to FIG. 4, the light extracting optical elements 282, 284, 286, 288, 290 may be configured to both redirect light out of their respective waveguides and to output this light with the appropriate amount of divergence or collimation for a particular depth plane associated with the waveguide. As a result, waveguides having different associated depth planes may have different configurations of light extracting optical elements, which output light with a different amount of divergence depending on the associated depth plane. In some embodiments, as discussed herein, the light extracting optical elements 282, 284, 286, 288, 290 are volumetric or surface features, which may be configured to output light at specific angles. For example, the light extracting optical elements 282, 284, 286, 288, 290 may be volume holograms, surface holograms, and/or diffraction gratings. Light extracting optical elements, such as diffraction gratings, are described in U.S. Patent Publication No. 2015/0178939, published Jun. 25, 2015, which is hereby incorporated by reference herein in its entirety. In some embodiments, the features 198, 196, 194, 192 are not lenses. Rather, they may simply be spacers (e.g., cladding layers and/or structures for forming air gaps).

In some embodiments, the light extracting optical elements 282, 284, 286, 288, 290 are diffractive features that form a diffraction pattern, or "diffractive optical element" (also referred to herein as a "DOE"). In some cases, the DOEs have a relatively low diffraction efficiency so that only a portion of the light of the beam is deflected (e.g., refracted, reflected, or diffracted) away toward the eye 304 with each intersection of the DOE, while the rest continues to move through a waveguide via total internal reflection. The light carrying the image information is thus divided into a number of related exit beams that exit the waveguide at a multiplicity of locations and the result is a fairly uniform pattern of exit emission toward the eye 304 for this particular collimated beam bouncing around within a waveguide.

In some embodiments, one or more DOEs are switchable between "on" states in which they actively diffract, and "off" states in which they do not significantly diffract. For instance, a switchable DOE may comprise a layer of polymer dispersed liquid crystal, in which microdroplets comprise a diffraction pattern in a host medium, and the refractive index of the microdroplets can be switched to substantially match the refractive index of the host material (in which case the pattern does not appreciably diffract incident light) or the microdroplet can be switched to an index that does not match that of the host medium (in which case the pattern actively diffracts incident light).

In some embodiments, the number and distribution of depth planes and/or depth of field can be varied dynamically based on the pupil sizes and/or orientations of the eyes of the viewer. In some embodiments, a camera 500 (e.g., a digital camera) can be used to capture images of the eye 304 to determine the size and/or orientation of the pupil of the eye 304. The camera 500 can be used to obtain images for use in determining the direction the wearer 60 is looking (e.g., eye pose) or for biometric identification of the wearer (e.g., via iris identification). In some embodiments, the camera 500 is attached to the frame 64 (as illustrated in FIG. 2) and may be in electrical communication with the processing modules 71 and/or 72, which may process image information from the camera 500 to determine, e.g., the pupil diameters and/or orientations of the eyes of the user 60. In some embodiments, one camera 500 is utilized for each eye, to separately determine the pupil size and/or orientation of each eye, thereby allowing the presentation of image information to each eye to be dynamically tailored to that eye. In some other embodiments, the pupil diameter and/or orientation of only a single eye 304 (e.g., using only a single camera 500 per pair of eyes) is determined and assumed to be similar for both eyes of the viewer 60.

For example, depth of field may change inversely with a viewer's pupil size. As a result, as the sizes of the pupils of the viewer's eyes decrease, the depth of field increases such that one plane not discernible because the location of that plane is beyond the depth of focus of the eye may become discernible and appear more in focus with reduction of pupil size and commensurate increase in depth of field. Likewise, the number of spaced apart depth planes used to present different images to the viewer may be decreased with decreased pupil size. For example, a viewer may not be able to clearly perceive the details of both a first depth plane and a second depth plane at one pupil size without adjusting the accommodation of the eye away from one depth plane and to the other depth plane. These two depth planes may, however, be sufficiently in focus at the same time to the user at another pupil size without changing accommodation.

In some embodiments, the display system may vary the number of waveguides receiving image information based upon determinations of pupil size and/or orientation, or upon receiving electrical signals indicative of particular pupil sizes and/or orientations. For example, if the user's eyes are unable to distinguish between two depth planes associated with two waveguides, then the controller 210 may be configured or programmed to cease providing image information to one of these waveguides. Advantageously, this may reduce the processing burden on the system, thereby increasing the responsiveness of the system. In embodiments in which the DOEs for a waveguide are switchable between on and off states, the DOEs may be switched to the off state when the waveguide does receive image information.

In some embodiments, it may be desirable to have an exit beam meet the condition of having a diameter that is less than the diameter of the eye of a viewer. However, meeting this condition may be challenging in view of the variability in size of the viewer's pupils. In some embodiments, this condition is met over a wide range of pupil sizes by varying the size of the exit beam in response to determinations of the size of the viewer's pupil. For example, as the pupil size decreases, the size of the exit beam may also decrease. In some embodiments, the exit beam size may be varied using a variable aperture.

Figure 5:
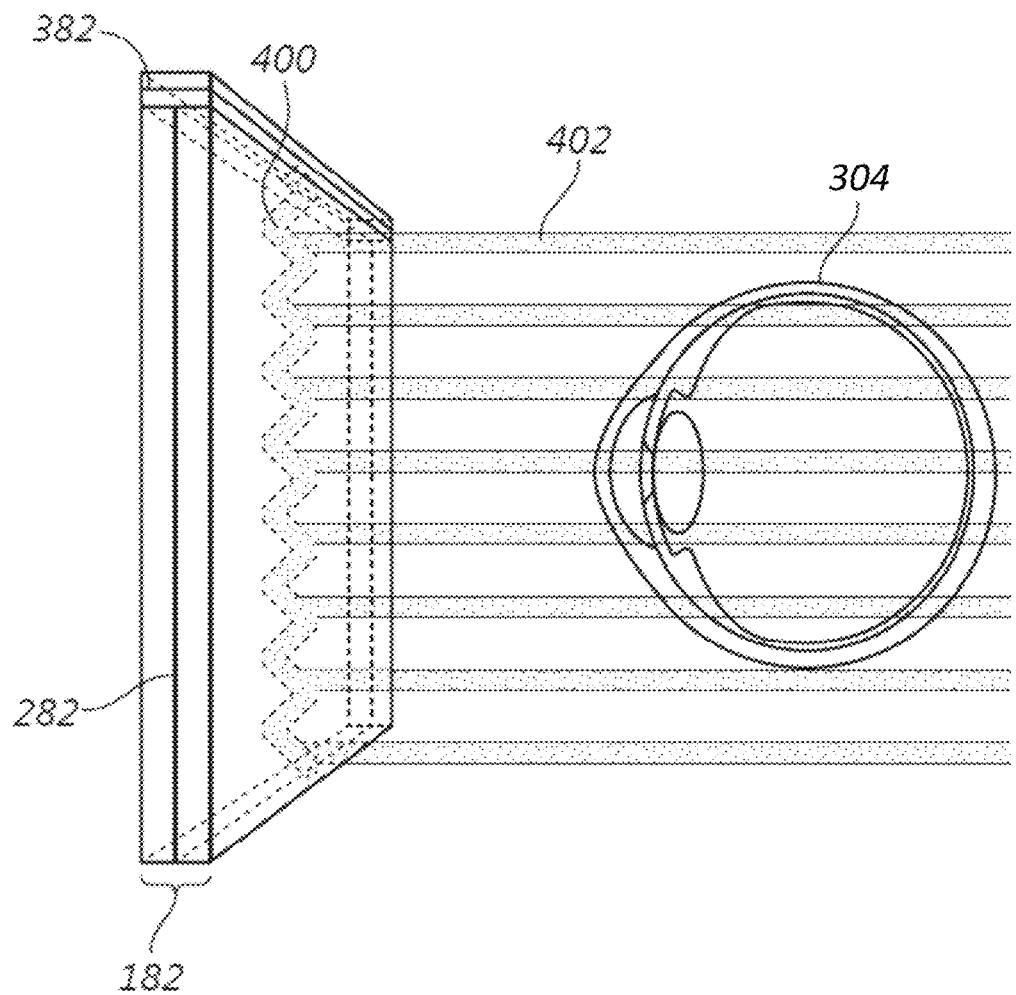
FIG. 5 shows example exit beams that may be outputted by a waveguide.

FIG. 5 shows an example of exit beams outputted by a waveguide. One waveguide is illustrated, but other waveguides in the waveguide assembly 178 may function similarly, where the waveguide assembly 178 includes multiple waveguides. Light 400 is injected into the waveguide 182 at the input edge 382 of the waveguide 182 and propagates within the waveguide 182 by TIR. At points where the light 400 impinges on the DOE 282, a portion of the light exits the waveguide as exit beams 402. The exit beams 402 are illustrated as substantially parallel but they may also be redirected to propagate to the eye 304 at an angle (e.g., forming divergent exit beams), depending on the depth plane associated with the waveguide 182. Substantially parallel exit beams may be indicative of a waveguide with light extracting optical elements that outcouple light to form images that appear to be set on a depth plane at a large distance (e.g., optical infinity) from the eye 304. Other waveguides or other sets of light extracting optical elements may output an exit beam pattern that is more divergent, which would require the eye 304 to accommodate to a closer distance to bring it into focus on the retina and would be interpreted by the brain as light from a distance closer to the eye 304 than optical infinity.

Figure 6:
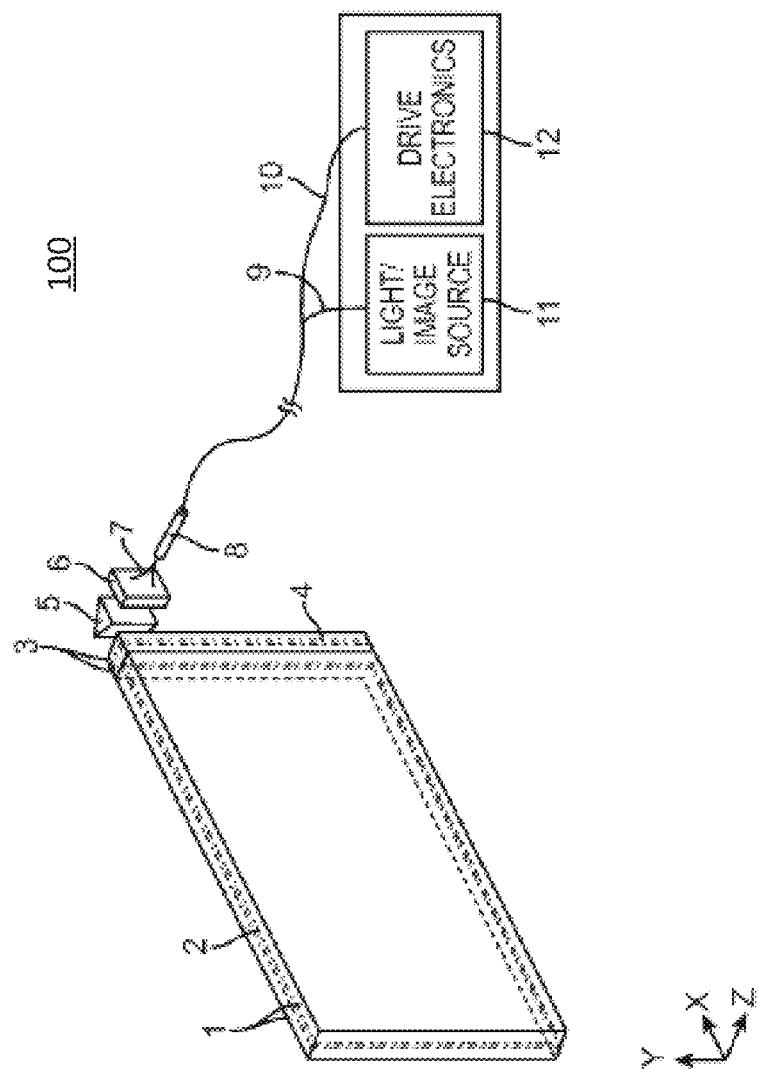
FIG. 6 is a schematic diagram showing an optical system including a waveguide apparatus, an optical coupler subsystem to optically couple light to or from the waveguide apparatus, and a control subsystem, used in the generation of a multi-focal volumetric display, image, or light field.

FIG. 6 shows another example of the optical display system 100 including a waveguide apparatus, an optical coupler subsystem to optically couple light to or from the waveguide apparatus, and a control subsystem. The optical system 100 can be used to generate a multi-focal volumetric, image, or light field. The optical system can include one or more primary planar waveguides 1 (only one is shown in FIG. 6) and one or more DOEs 2 associated with each of at least some of the primary waveguides 1. The planar waveguides 1 can be similar to the waveguides 182, 184, 186, 188, 190 discussed with reference to FIG. 4. The optical system may employ a distribution waveguide apparatus, to relay light along a first axis (vertical or Y-axis in view of FIG. 6), and expand the light's effective exit pupil along the first axis (e.g., Y-axis). The distribution waveguide apparatus, may, for example include a distribution planar waveguide 3 and at least one DOE 4 (illustrated by double dash-dot line) associated with the distribution planar waveguide 3. The distribution planar waveguide 3 may be similar or identical in at least some respects to the primary planar waveguide 1, having a different orientation therefrom. Likewise, the at least one DOE 4 may be similar or identical in at least some respects to the DOE 2. For example, the distribution planar waveguide 3 and/or DOE 4 may be comprised of the same materials as the primary planar waveguide 1 and/or DOE 2, respectively. Embodiments of the optical display system 100 shown in FIG. 4 or 6 can be integrated into the wearable display system 100 shown in FIG. 2.

The relayed and exit-pupil expanded light is optically coupled from the distribution waveguide apparatus into the one or more primary planar waveguides 10. The primary planar waveguide 1 relays light along a second axis, in some cases orthogonal to first axis, (e.g., horizontal or X-axis in view of FIG. 6). Notably, the second axis can be a non-orthogonal axis to the first axis. The primary planar waveguide 1 expands the light's effective exit pupil along that second axis (e.g., X-axis). For example, the distribution planar waveguide 3 can relay and expand light along the vertical or Y-axis, and pass that light to the primary planar waveguide 1 which relays and expands light along the horizontal or X-axis.

The optical system may include one or more sources of colored light (e.g., red, green, and blue laser light) 110 which may be optically coupled into a proximal end of a single mode optical fiber 9. A distal end of the optical fiber 9 may be threaded or received through a hollow tube 8 of piezoelectric material. The distal end protrudes from the tube 8 as fixed-free flexible cantilever 7. The piezoelectric tube 8 can be associated with 4 quadrant electrodes (not illustrated). The electrodes may, for example, be plated on the outside, outer surface or outer periphery or diameter of the tube 8. A core electrode (not illustrated) is also located in a core, center, inner periphery or inner diameter of the tube 8.

Drive electronics 12, for example electrically coupled via wires 10, drive opposing pairs of electrodes to bend the piezoelectric tube 8 in two axes independently. The protruding distal tip of the optical fiber 7 has mechanical modes of resonance. The frequencies of resonance can depend upon a diameter, length, and material properties of the optical fiber 7. By vibrating the piezoelectric tube 8 near a first mode of mechanical resonance of the fiber cantilever 7, the fiber cantilever 7 is caused to vibrate, and can sweep through large deflections.

By stimulating resonant vibration in two axes, the tip of the fiber cantilever 7 is scanned biaxially in an area filling two dimensional (2D) scan. By modulating an intensity of light source(s) 11 in synchrony with the scan of the fiber cantilever 7, light emerging from the fiber cantilever 7 forms an image. Descriptions of such a set up are provided in U.S. Patent Publication No. 2014/0003762, which is incorporated by reference herein in its entirety.

A component of an optical coupler subsystem collimates the light emerging from the scanning fiber cantilever 7. The collimated light is reflected by mirrored surface 5 into the narrow distribution planar waveguide 3 which contains the at least one diffractive optical element (DOE) 4. The collimated light propagates vertically (relative to the view of FIG. 6) along the distribution planar waveguide 3 by total internal reflection, and in doing so repeatedly intersects with the DOE 4. The DOE 4 in some cases has a low diffraction efficiency. This causes a fraction (e.g., 10%) of the light to be diffracted toward an edge of the larger primary planar waveguide 1 at each point of intersection with the DOE 4, and a fraction of the light to continue on its original trajectory down the length of the distribution planar waveguide 3 via TIR.

At each point of intersection with the DOE 4, additional light is diffracted toward the entrance of the primary waveguide 1. By dividing the incoming light into multiple outcoupled sets, the exit pupil of the light is expanded vertically by the DOE 4 in the distribution planar waveguide 3. This vertically expanded light coupled out of distribution planar waveguide 3 enters the edge of the primary planar waveguide 1.

Light entering primary waveguide 1 propagates horizontally (relative to the view of FIG. 6) along the primary waveguide 1 via TIR. As the light intersects with DOE 2 at multiple points as it propagates horizontally along at least a portion of the length of the primary waveguide 10 via TIR. The DOE 2 may advantageously be designed or configured to have a phase profile that is a summation of a linear diffraction pattern and a radially symmetric diffractive pattern, to produce both deflection and focusing of the light. The DOE 2 may advantageously have a low diffraction efficiency (e.g., 10%), so that only a portion of the light of the beam is deflected toward the eye of the view with each intersection of the DOE 2 while the rest of the light continues to propagate through the waveguide 1 via TIR.

At each point of intersection between the propagating light and the DOE 2, a fraction of the light is diffracted toward the adjacent face of the primary waveguide 1 allowing the light to escape the TIR, and emerge from the face of the primary waveguide 1. In some embodiments, the radially symmetric diffraction pattern of the DOE 2 additionally imparts a focus level to the diffracted light, both shaping the light wavefront (e.g., imparting a curvature) of the individual beam as well as steering the beam at an angle that matches the designed focus level.

Accordingly, these different pathways can cause the light to be coupled out of the primary planar waveguide 1 by a multiplicity of DOEs 2 at different angles, focus levels, and/or yielding different fill patterns at the exit pupil. Different fill patterns at the exit pupil can be beneficially used to create a light field display with multiple depth planes. Each layer in the waveguide assembly or a stack of layers (e.g., 3 layers) may be employed to generate a respective color (e.g., red, blue, green). Thus, for example, a first stack of three adjacent layers may be employed to respectively produce red, blue and green light at a first focal depth. A second stack of three adjacent layers may be employed to respectively produce red, blue and green light at a second focal depth. Multiple stacks may be employed to generate a full 3D or 4D color image light field with various focal depths.

Other Components of AR Systems

In many implementations, the AR system may include other components in addition to the display system 100. The AR devices may, for example, include one or more haptic devices or components. The haptic device(s) or component(s) may be operable to provide a tactile sensation to a user. For example, the haptic device(s) or component(s) may provide a tactile sensation of pressure and/or texture when touching virtual content (e.g., virtual objects, virtual tools, other virtual constructs). The tactile sensation may replicate a feel of a physical object which a virtual object represents, or may replicate a feel of an imagined object or character (e.g., a dragon) which the virtual content represents. In some implementations, haptic devices or components may be worn by the user (e.g., a user wearable glove). In some implementations, haptic devices or components may be held by the user.

The AR system may, for example, include one or more physical objects which are manipulable by the user to allow input or interaction with the AR system. These physical objects are referred to herein as totems. Some totems may take the form of inanimate objects, for example a piece of metal or plastic, a wall, a surface of table. Alternatively, some totems may take the form of animate objects, for example a hand of the user. As described herein, the totems may not actually have any physical input structures (e.g., keys, triggers, joystick, trackball, rocker switch). Instead, the totem may simply provide a physical surface, and the AR system may render a user interface so as to appear to a user to be on one or more surfaces of the totem. For example, the AR system may render an image of a computer keyboard and trackpad to appear to reside on one or more surfaces of a totem. For instance, the AR system may render a virtual computer keyboard and virtual trackpad to appear on a surface of a thin rectangular plate of aluminum which serves as a totem. The rectangular plate does not itself have any physical keys or trackpad or sensors. However, the AR system may detect user manipulation or interaction or touches with the rectangular plate as selections or inputs made via the virtual keyboard and/or virtual trackpad.

Examples of haptic devices and totems usable with the AR devices, HMD, and display systems of the present disclosure are described in U.S. Patent Publication No. 2015/0016777, which is incorporated by reference herein in its entirety.

Example Waveguide Display

Figure 7A:
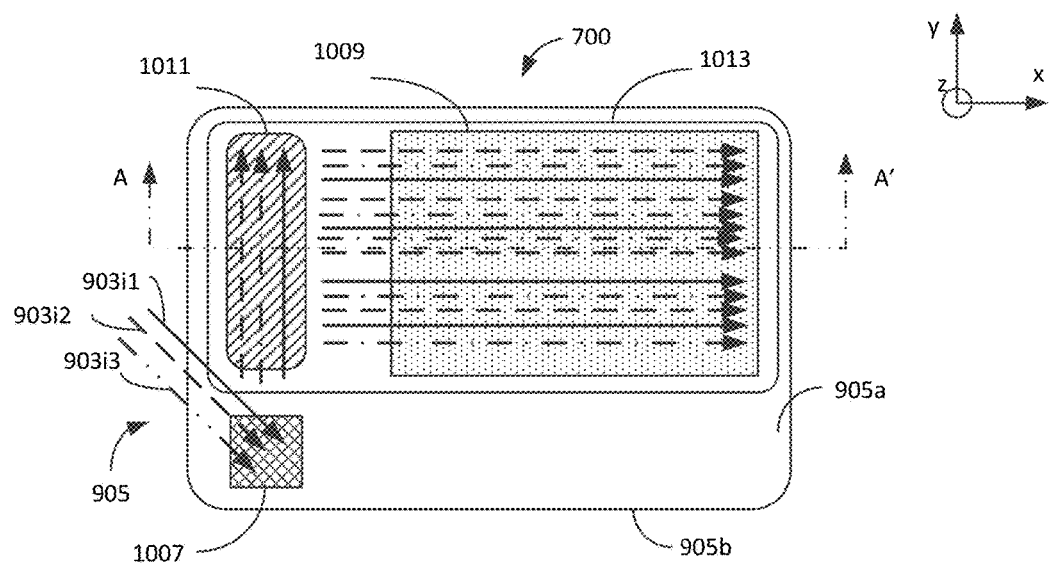
FIG. 7A is a top view that schematically illustrates an example of a display including a waveguide that comprises an incoupling optical element, a light distributing element, and an outcoupling optical element.
Figure 7B:
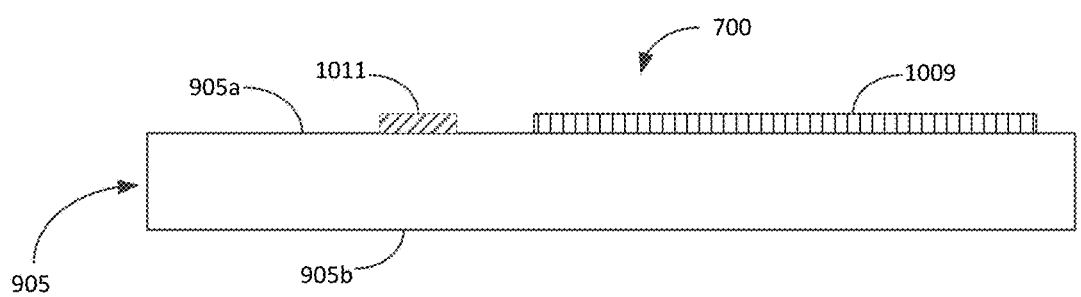
FIG. 7B is a cross-sectional view of the display depicted in FIG. 7A along the axis A-A'.

FIG. 7A is a top view that schematically illustrates an example of a display 700 including a waveguide 905 that includes an incoupling optical element 1007, a light distributing element 1011, and an outcoupling optical element 1009. FIG. 7B schematically illustrates a cross-sectional view of the display 700 depicted in FIG. 7A along the axis A-A'.

The waveguide 905 may be part of the stack of waveguides 178 in the display system 100 shown in FIG. 4. For example, the waveguide 905 may correspond to one of the waveguides 182, 184, 186, 188, 190, and the outcoupling optical element 1009 may correspond to the light extracting optical elements 282, 284, 286, 288, 290 of the display system 100.

The display 700 is configured such that incoming incident light of different wavelengths represented by light rays 903$i$1, 903$i$2 and 903$i$3 (solid, dashed, and dash-double-dotted lines, respectively) are coupled into the waveguide 905 by the incoupling optical element 1007. The incoming incident light to the waveguide 905 can be projected from an image injection device (such as one of the image injection devices 200, 202, 204, 206, 208 illustrated in FIG. 4). The incoupling optical element 1007 can be configured to couple wavelengths of the incident light into the waveguide 905 at appropriate angles that support propagation through the waveguide 905 by virtue of total internal reflection (TIR).

A light distributing element 1011 can be disposed in the optical path along which the different wavelengths of light 903$i$1, 903$i$2 and 903$i$3 propagate through the waveguide 905. The light distributing element 1011 can be configured to redirect a portion of the light from the incoupling optical element 1007 toward the outcoupling optical element 1009, thereby enlarging the beam size of the interacting light along the direction of propagation. Accordingly, the light distributing element 1011 may be advantageous in enlarging the exit pupil of the display 700. In some embodiments, the light distributing element 1011 may thus function as an orthogonal pupil expander (OPE).

The outcoupling optical element 1009 can be configured to redirect incoupled light that is incident on the element 1009 out of the x-y plane of the waveguide 905 at appropriate angles (e.g., in the z-direction) and efficiencies to facilitate proper overlay of light at different wavelengths and at different depth planes such that a viewer can perceive a color image of good visual quality. The outcoupling optical element 1009 can have an optical power that provides a divergence to the light that exits through the waveguide 905 such that the image formed by the light that exits through the waveguide 905 appears (to the viewer) to originate from a certain depth. The outcoupling optical element 1009 can enlarge the exit pupil of the display 700 and may be referred to as an exit pupil expander (EPE) that directs light to the viewer's eye.

The incoupling optical element 1007, the outcoupling optical element 1009, and the light distributing element 1011 can each include one or more gratings, such as, for example, an analog surface relief grating (ASR), binary surface relief structures (BSR), volume holographic optical elements (VHOE), digital surface relief structures, and/or volume phase holographic material (e.g., holograms recorded in volume phase holographic material), or switchable diffractive optical elements (e.g., a polymer dispersed liquid crystal (PDLC) grating). Other types of gratings, holograms, and/or diffractive optical elements, configured to provide the functionality disclosed herein, may also be used. In various embodiments, the incoupling optical element 1007 can include one or more optical prisms, or optical components including one or more diffractive elements and/or refractive elements. The various sets of diffractive or grating structures can be disposed on the waveguide by using fabrication methods such as injection compression molding, UV replication, or nano-imprinting of the diffractive structures.

Figure 8:
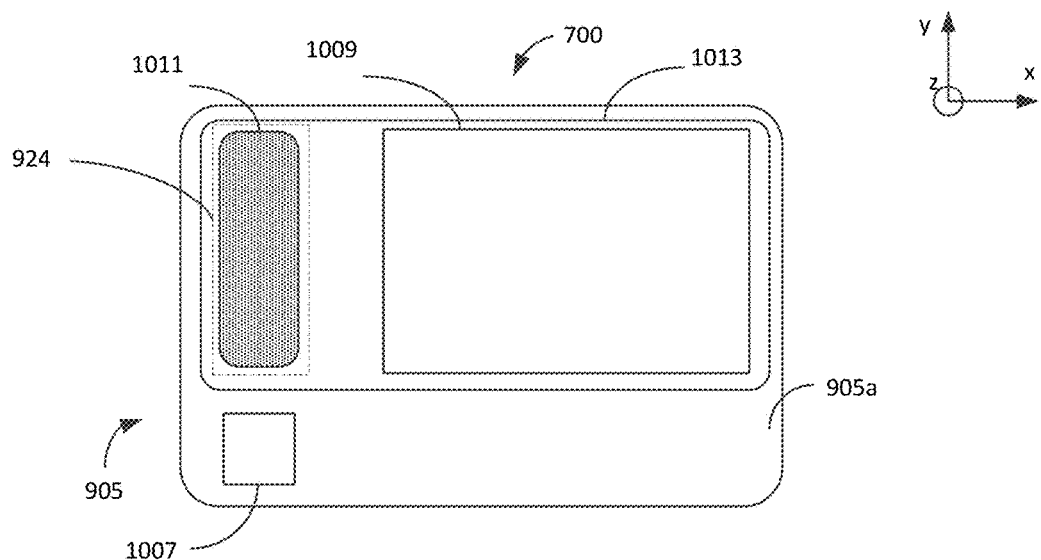
FIG. 8 is a top view that schematically illustrates an example of a display including a waveguide, an incoupling optical element, a light distributing element including a wavelength selective region, and an outcoupling optical element.

The incoupling optical element 1007, the outcoupling optical element 1009, or the light distributing element 1011 need not be a single element (e.g., as schematically depicted in FIGS. 7A, 7B, and 8) and each such element can include a plurality of such elements. These elements can be disposed on one (or both) of the surfaces 905*a*, 905*b* of the waveguide 905. In the example shown in FIGS. 7A, 7B, and 8, the incoupling optical element 1007, the outcoupling optical element 1009, and the light distributing element 1011 are disposed on the surface 905*a* of the waveguide 905.

The light distributing element 1011 can be disposed adjacent the first or the second surface 905*a* or 905*b* of the waveguide 905. In various embodiments, the light distributing element 1011 can be disposed such that it is spaced apart from the outcoupling optical element 1009, although the light distributing element 1011 need not be so configured in some embodiments. The light distributing element 1011 can be integrated with one or both of the first or the second surface 905*a* or 905*b* of the waveguide 905. In some embodiments, as disclosed herein, the light distributing element 1011 may be disposed in the bulk of waveguide 905.

In some embodiments, one or more wavelength selective filters may be integrated with or disposed adjacent to the incoupling optical element 1007, the outcoupling optical element 1009, or the light distributing element 1011. The display 700 illustrated in FIG. 7A includes the wavelength selective filter 1013, which is integrated into or on a surface of the waveguide 905. The wavelength selective filters can be configured to attenuate some portion of light at the one or more wavelengths that may be propagating along various directions in the waveguide 905. As will be further described herein, the wavelength selective filters can be absorptive filters such as color band absorbers or distributed switches (e.g., electro-optic materials).

Examples of Waveguides Using Wavelength Selective Filters

Light can be separated into constituent colors (e.g., red (R), green (G), and blue (B)), and it may be desirable to send different constituent colors to different layers of the waveguide assembly. For example, each of the depth planes of the waveguide assembly may correspond to one or more layers to display particular colors of light (e.g., R, G, and B layers). As an example, a waveguide assembly having three depth planes, with each depth plane comprising three colors (e.g., R, G, and B), would include nine waveguide layers. Other numbers of depth planes and/or color layers per depth plane are available. The waveguide assembly can be configured to send light of the appropriate color to a particular layer in a particular depth plane (e.g., red light for a red color layer in a particular depth plane). It may be desirable if the light propagating in a particular color layer (e.g., a red layer) is substantially all in the desired color (e.g., red) with little admixture of other colors (e.g., blue or green) in that color layer. As will be further described below, various implementations of the waveguide assembly can be configured to filter out undesired wavelengths of light in particular waveguide layers so that substantially only a single color (the desired color) propagates in that layer. Some such implementations may advantageously provide better color separation among the different color layers and lead to more accurate color representation by the display. Accordingly, color filters may be used to filter out the undesired constituent colors at different depth planes.

As described with reference to FIG. 7A, certain wavelengths of the light can be deflected (e.g., refracted, reflected, or diffracted) at a first layer of the incoupling optical element 1007 into a first waveguide. In some designs, the incoupling optical element 1007 includes two or more incoupling optical elements. For example, light may be deflected by a first incoupling optical element into a first waveguide of a waveguide stack while other wavelengths may be transmitted to other layers of the incoupling optical element to be directed to other waveguides in the stack. For example, the first layer of the incoupling optical element may be configured to deflect red light into the first waveguide (configured for red light) while transmitting other wavelengths (e.g., green and blue) to other layers of the waveguide stack.

However, the incoupling optical elements may not always be perfectly configured to deflect all of the light at the given wavelength or transmit all of the light at the other wavelengths. For example, while the first layer of the incoupling optical element may be configured to deflect primarily red light, physical limitations may inadvertently cause the first layer of the incoupling optical element to deflect an amount of other wavelengths (e.g., green and blue) into the first waveguide of the stack. Similarly, some of the red light may be transmitted through the first layer of the incoupling optical element to other layers of the incoupling optical elements and be deflected into the associated waveguides (e.g., into green and blue waveguides).

To compensate for these imperfections, one or more portions of the waveguide stack can include a region that is configured to filter out or attenuate an unwanted wavelength or to isolate a desired wavelength. For example, the first waveguide may be configured to propagate red light, so the waveguide may include a region (e.g., a tinted or dyed region) that is configured to attenuate the green and blue light in order to isolate the red light. In some implementations, the light distributing element 1011 includes (or is included in) the tinted or dyed region The region in and around the light distributing element 1011 may provide a greater volume than the incoupling optical element 1007 through which light may propagate. Providing the filtering functionality in the region of the light distributing element 1011 can allow the light manipulation action (e.g., filtering) to operate over a longer path length (which makes the filtering more effective) and/or reduce interferences along the primary optical path (e.g., the incoupling optical element 1007 and the outcoupling optical element 1009).

FIG. 8 is a top view that schematically illustrates an example of a display 700 including a waveguide 905 that is generally similar to display shown in FIGS. 7A and 7B. The waveguide 906 includes the incoupling optical element 1007, the light distributing element 1011, and the outcoupling optical element 1009. The waveguide 905 also includes a wavelength selective region 924 that can selectively propagate certain wavelengths of light while selectively attenuating other wavelengths of light. For example, the wavelength selective region can include a color filter. In the example shown in FIG. 8, the wavelength selective region 924 can be disposed in and/or distributed through a region of the waveguide 905 in or around the light distributing element 1011. For example, light received from the incoupling optical element 1007 can be selectively filtered by the wavelength selective region 924 before being propagated to the outcoupling optical element 1009.

The wavelength selective region 924 represents a portion of the waveguide 905 that includes a distributed filter and/or switch material in at least some part. In some embodiments, the wavelength selective region 924 includes a plurality of wavelength selective regions. As shown in the example in FIG. 8, the wavelength selective region 924 represents the only portion of the optical path that includes a wavelength selective filter, such that, e.g., the incoupling optical element 1007 and the outcoupling optical element 1009 do not include wavelength selective filters. Because the light exiting the outcoupling optical element 1009 can include light from the world 144, the outcoupling optical element 1009 may not include a wavelength selective region so that the light from the world is not colored or tinted. Similarly, in order to maintain the composition of the incoming light into it, the incoupling optical element 1007 may optionally also not be selective for wavelength.

It may be advantageous to tint or dye layers of the light distributing element 1011 and not the incoupling optical element 1007 or the outcoupling optical element 1009. If the light is tinted before it enters the incoupling optical element 1007, this may attenuate the intensity of the incoupled light. If the incoupling optical element 1007 is tinted, the light may be coupled to the wrong waveguide. If the outcoupling optical element 1009 is tinted, light from the outside world that passes through the display 700 may be tinted or filtered, which may lead to distortions in the viewer's perception of the outside world. Each of these examples may be undesirable in certain designs.

Figure 9:
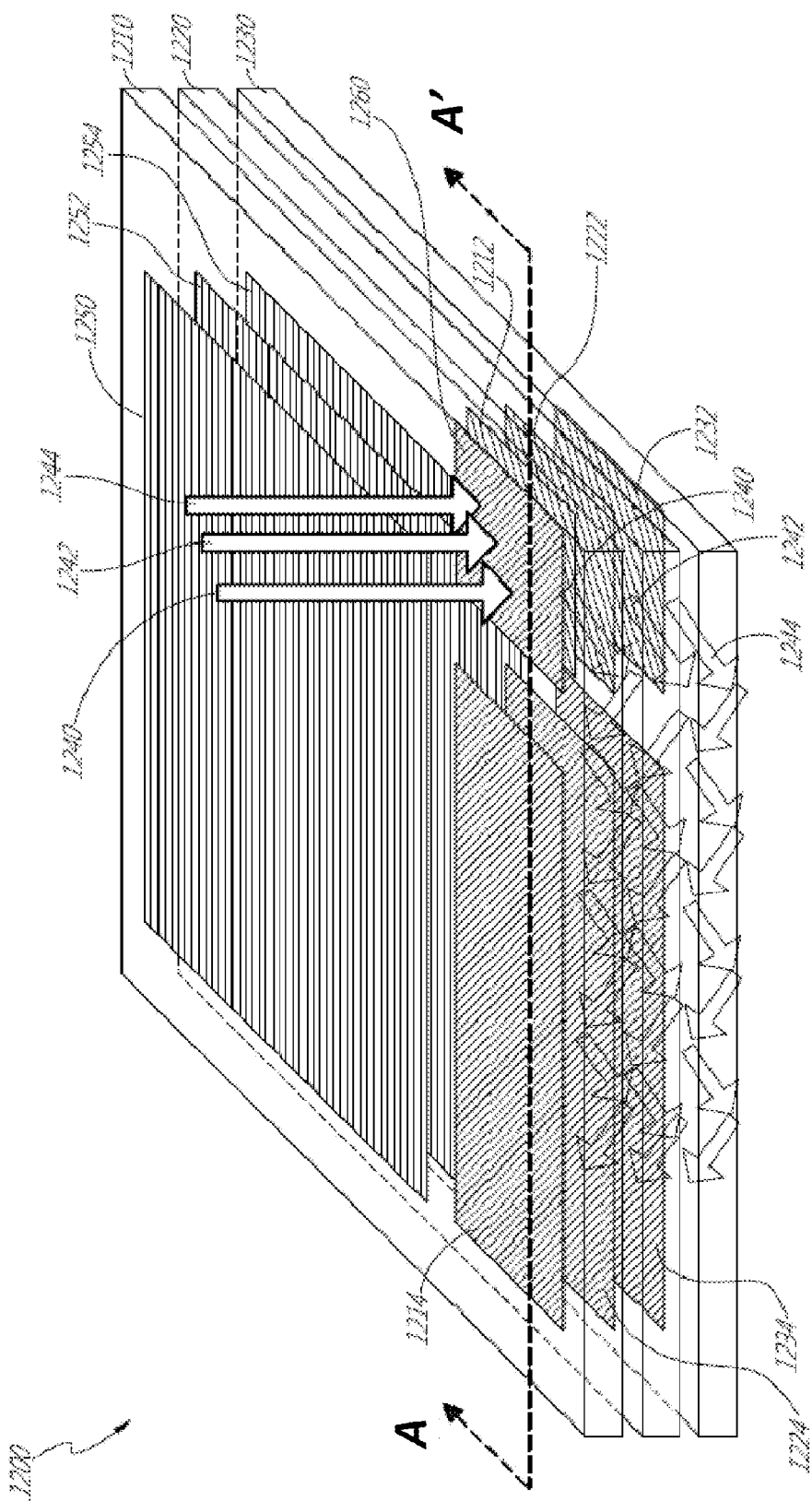
FIG. 9 illustrates a perspective view of an example a stacked waveguide assembly.

FIG. 9 illustrates a perspective view of an example stack 1200 of waveguides. The view along the axis A-A' in FIG. 9 is generally similar to the view shown in FIG. 7B. In this example, the stack 1200 of waveguides includes waveguides 1210, 1220, and 1230. The layers of a light distributing element 1210, 1220, 1230 can correspond to the light distributing element 1011 in FIG. 8. As illustrated, each waveguide can include an associated layer of the incoupling optical element, with, e.g., the layer of the incoupling optical element 1212 disposed on a surface (e.g., a bottom surface) of the waveguide 1210, the layer of the incoupling optical element 1224 disposed on a surface (e.g., a bottom surface) of the waveguide 1220, and the layer of the incoupling optical element 1232 disposed on a surface (e.g., a bottom surface) of the waveguide 1230. One or more of the layers of the incoupling optical element 1212, 1222, 1232 may be disposed on the top surface of the respective waveguide 1210, 1220, 1230 (particularly where the one or more layers of the incoupling optical element are optically transmissive and/or deflective). Similarly, the other incoupling optical elements 1222, 1232 may be disposed on the bottom surface of their respective waveguide 1220, 1230 (or on the top surface of the next lower waveguide). In some designs, the layers of the incoupling optical element 1212, 1222, 1232 are disposed in the volume of the respective waveguide 1210, 1220, 1230.

The incoupling optical elements 1212, 1222, 1232 may include a wavelength selective filter, such as a filter that selectively reflects, refracts, transmits, and/or diffracts one or more wavelengths of light, while transmitting, diffracting, refracting, and/or reflecting other wavelengths of light. Examples of wavelength selective filters include color filters such as dyes, tints, or stains. The wavelength selective filter can include a dichroic filter, a Bragg grating, or a polarizer. The wavelength selective filter may include a bandpass filter, a shortpass filter, or a longpass filter. Some wavelength selective filters can be electronically switchable. While illustrated on one side or corner of their respective waveguide 1210, 1220, 1230, the layers of the incoupling optical element 1212, 1222, 1232 may be disposed in other areas of their respective waveguide 1210, 1220, 1230 in other embodiments. The waveguides 1210, 1220, 1230 may be spaced apart and separated by gas (e.g., air), liquid, and/or solid layers of material.

With continued reference to FIG. 9, light rays 1240, 1242, 1244 are incident on the stack 1200 of waveguides. The stack 1200 of waveguides may be part of the stack of waveguides in the display system 100 (FIG. 4). For example, the waveguides 1210, 1220, 1230 may correspond to three of the waveguides 182, 184, 186, 188, 190, and the light rays 1240, 1242, 1244 may be injected into the waveguides 1210, 1220, 1230 by one or more image injection devices 200, 202, 204, 206, 208.

In certain embodiments, the light rays 1240, 1242, 1244 have different properties, e.g., different wavelengths or ranges of wavelengths, which may correspond to different colors. The layers of the incoupling optical element 1212, 122, 1232 can be configured to selectively deflect the light rays 1240, 1242, 1244 based upon a particular feature of the property of light, (e.g., wavelength, polarization) while transmitting light that does not have that property or feature. In some embodiments, the layers of the incoupling optical element 1212, 122, 1232 each selectively deflect one or more particular wavelengths of light, while transmitting other wavelengths. The non-deflected light may propagate into a different waveguide and/or waveguide layer.

For example, the layer of the incoupling optical element 1212 may be configured to selectively deflect a light ray 1240, which has a first wavelength or range of wavelengths, while transmitting the light rays 1242 and 1244, which have different second and third wavelengths or ranges of wavelengths, respectively. As shown in FIG. 9, the deflected light rays 1240, 1242, 1244 are deflected so that they propagate through the corresponding waveguide 1210, 1220, 1230; that is, the layers of the incoupling optical element 1212, 1222, 1232 of each respective waveguide couple (e.g., deflect) light into the corresponding waveguide 1210, 1220, 1230. The light rays 1240, 1242, 1244 are deflected at angles that cause the light to propagate through the respective waveguide 1210, 1220, 1230 (e.g., by TIR).

The light rays 1240, 1242, 1244 are incident on the corresponding layer of the light distributing element 1214, 1224, 1234. The layers of the light distributing element 1214, 1224, 1234 deflect the light rays 1240, 1242, 1244 so that they propagate towards the corresponding layer of the outcoupling optical element 1250, 1252, 1254.

In some embodiments, an angle-modifying optical element 1260 may be provided to alter the angle at which the light rays 1240, 1242, 1244 strike the layers of the incoupling optical element. The angle-modifying optical element can cause the light rays 1240, 1242, 1244 to impinge on the corresponding layer of the incoupling optical element 1212, 1222, 1232 at angles appropriate for TIR. For example, in some embodiments, the light rays 1240, 1242, 1244 may be incident on the angle-modifying optical element 1260 at an angle normal to the waveguide 1210. The angle-modifying optical element 1260 then changes the direction of propagation of the light rays 1240, 1242, 1244 so that they strike the layers of the incoupling optical elements 1212, 1222, 1232 at an angle of less than 90 degrees relative to the surface of waveguide 1210. The angle-modifying optical element 1260 may include a grating, a prism, and/or a mirror.

Figure 10A:
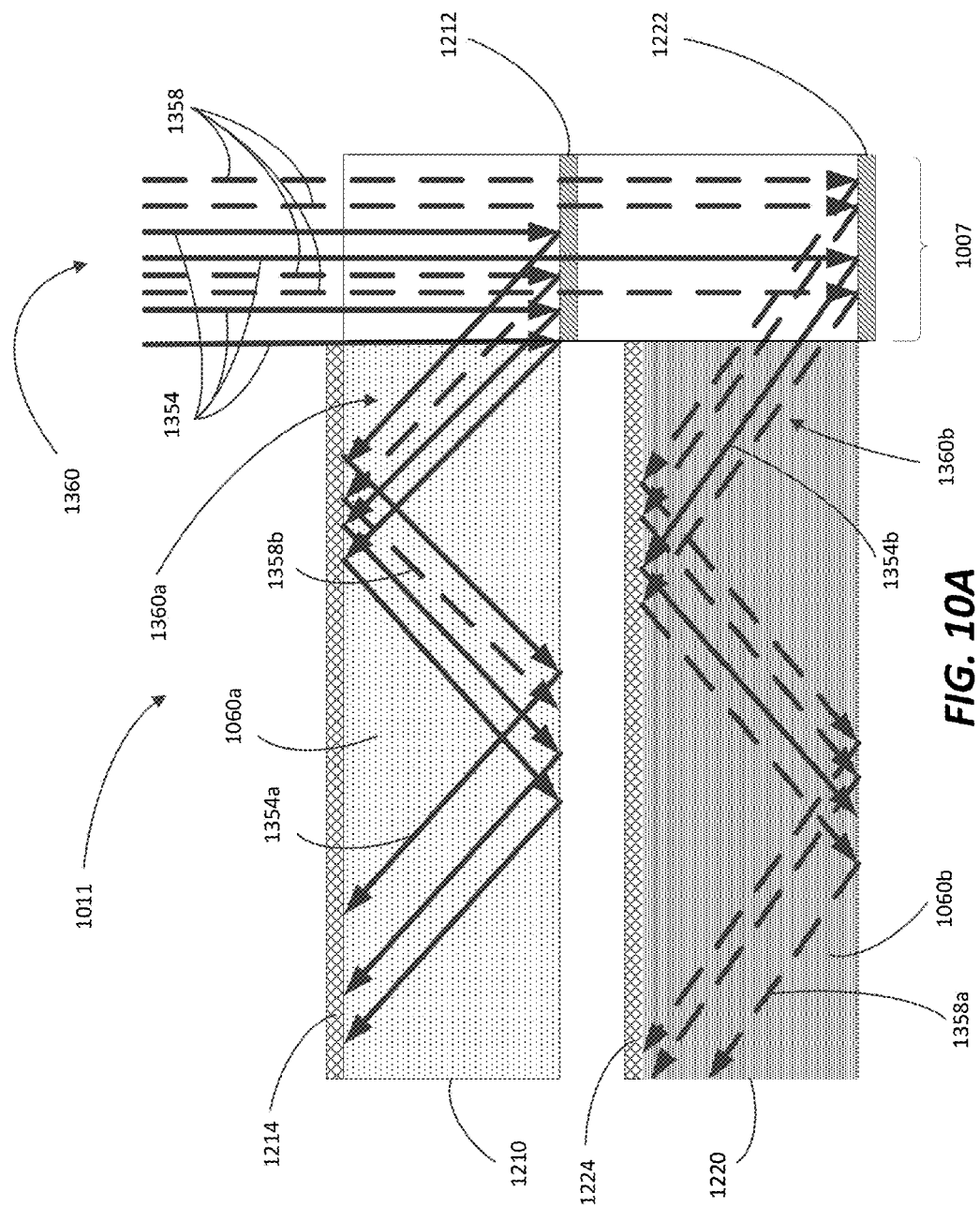
FIG. 10A is a side view that schematically illustrates an example display where two waveguides include color filters.

FIG. 10A is a side view that schematically illustrates an example display where two waveguides 1210, 1220 of the light distributing element 1011 include color filters 1060a, 1060b. The number of waveguides in a given embodiment of the light distributing element 1011 could be greater or fewer than two. As a light beam 1360 enters the display, part of the light is deflected into the first waveguide 1210 while some of the light continues propagating until it is deflected into the second waveguide 1220. The incoming light beam 1360 (e.g., white light) may include multiple wavelengths 1354, 1358 of light (represented by different dashing patterns in FIG. 10A), which may comprise wavelengths $\lambda 1$ and $\lambda 2$. The number of constituent light beams may be greater or fewer than two. For example, $\lambda 1$ and $\lambda 2$ may represent different colors of light that are being injected into the display (e.g., blue and green). Any combination of colors can be described by $\lambda 1$ and $\lambda 2$. The incoming light beam 1360 can comprise visible light, or in various implementations, non-visible light such as infrared or ultraviolet light.

As shown in the example in FIG. 10A, the waveguides 1210, 1220 include color filters 1060a, 1060b. Each waveguide 1210, 1220 may be associated with a particular design wavelength. This can mean that a waveguide that is associated with a design wavelength includes an incoupling optical element that is configured to deflect light at the design wavelength to an associated layer of the light distributing element and/or that the associated wavelength selective region is configured to attenuate light not at the design wavelength. As shown in FIG. 10A, for example, the first waveguide 1210 may have $\lambda 1$ as a design wavelength, and the second waveguide 1220 may have $\lambda 2$ as a design wavelength. In this example, the first layer of the incoupling optical element 1212 would be configured to deflect $\lambda 1$ to the first layer of the light distributing element 1214, and the second layer of the incoupling optical element 1222 would be configured to deflect $\lambda 2$ to the second layer of the light distributing element 1224.

The color filters 1060a, 1060b can be designed or tuned to purify or isolate a desired wavelength or set of wavelengths for the corresponding waveguide 1210, 1220. Alternatively, the color filters 1060a, 1060b can attenuate undesired wavelengths. For example, the first color filter 1060a may include a tint that attenuates red light. Similarly, the second color filter 1060b may include a tint that attenuates green light. The color filters 1060a, 1060b can optionally be electronically switchable so that they attenuate light when they are switched on and do not attenuate light when switched off. Examples of color filters include materials that are dyed, tinted, or stained. Color filters may optionally include a dichroic filter or a Bragg grating.

References to a given color of light throughout this disclosure will be understood to encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 492-577 nm, and blue light may include light of one or more wavelengths in the range of about 435-493 nm. The waveguides described herein can be configured to operate on wavelength bands outside the visual, e.g., infrared or ultraviolet. Similarly, the term "a wavelength" should be understood to mean "a single wavelength" or "a range of wavelengths" in various implementations. For example, the wavelength represented by $\lambda 1$ may represent blue light, which may include light of one or more wavelengths in the range of about 450-470 nm.

As depicted in FIG. 10A, each waveguide 1210, 1220 may be associated with a particular color filter 1060a, 1060b. When the incoming light beam 1360 enters the incoupling optical element 1007 and reaches a first layer of the incoupling optical element 1212, the first constituent light beam 1354 is deflected (e.g., refracted, reflected, or diffracted) at least in part due to its wavelength λ1. In some instances, an undeflected first constituent light beam 1354*b* may be transmitted through the first layer of the incoupling optical element 1212 at least in part due to its λ1 not being fully optically interactive with the first layer of the incoupling optical element 1212. When the incoming light beam 1360 reaches the first layer of the incoupling optical element 1212, a second constituent light beam 1358 is transmitted at least in part due to its wavelength λ2. In some instances, an amount of an untransmitted second constituent light beam 1358*b* may deflect off the first layer of the incoupling optical element 1212 at least in part due to its λ2 being optically interactive with the first layer of the incoupling optical element 1212.

With continued reference to FIG. 10A, in certain embodiments, a first resultant light beam 1360*a* includes a first target light beam 1354*a*, which is at the design wavelength for the first waveguide 1210, and the untransmitted second constituent light beam 1358*b*, which is not at the design wavelength for the first waveguide. In certain embodiments, in order to attenuate the intensity of the untransmitted second constituent light beam 1358*b*, the first waveguide 1210 includes a first color filter 1060*a* as described herein. Due at least in part to the first color filter 1060*a*, as schematically depicted in FIG. 10A, the intensity of the untransmitted second constituent light beam 1358*b* may be attenuated as it propagates through the first waveguide 1210. In certain embodiments, the intensity of the untransmitted second constituent light beam 1358*b* is attenuated relative to the first target light beam 1354*a*. The first layer of the light distributing element 1214 can be configured to deflect the first target light beam 1354*a* to an associated layer of the outcoupling optical element (not shown).

Similarly, in some embodiments, a second resultant light beam 1360*b* may include a second target light beam 1358*a*, which is at the design wavelength for the second waveguide 1220, and the undeflected first constituent light beam 1354*b*, which is not at the design wavelength for the second waveguide 1220. In certain embodiments, in order to attenuate the intensity of the undeflected first constituent light beam 1354*b*, the first waveguide 1210 includes a second color filter 1060*b* as described herein. Due at least in part to the second color filter 1060*b*, as schematically depicted in FIG. 10A, the intensity of the undeflected first constituent light beam 1354*b* can be attenuated as it propagates through the second waveguide 1220. In certain embodiments, the intensity of the undeflected first constituent light beam 1354*b* is attenuated relative to the second target light beam 1358*a*. The second layer of the light distributing element 1224 can be configured to deflect the second target light beam 1358*a* to an associated layer of the outcoupling optical element (not shown).

The light 1360 may enter the waveguide stack and be coupled into a proximal surface of the first waveguide 1210. The first layer of the incoupling optical element 1212 may be disposed on a distal surface of the first waveguide 1210 and/or on a proximal surface of the second waveguide 1220. In some designs, the first layer of the incoupling optical element 1212 is disposed within the volume of the first waveguide 1210. The first layer of the incoupling optical element may be disposed parallel to one or both of the proximal and distal surfaces of the first waveguide 1210. As shown, the proximal surface and the distal surface of the first waveguide are parallel to one another. In some configurations, the proximal surface may not be parallel to the distal surface. The first layer of the incoupling optical element 1212 may be disposed at an angle relative to the distal surface and/or proximal surface of the first waveguide 1210.

Figure 10B:
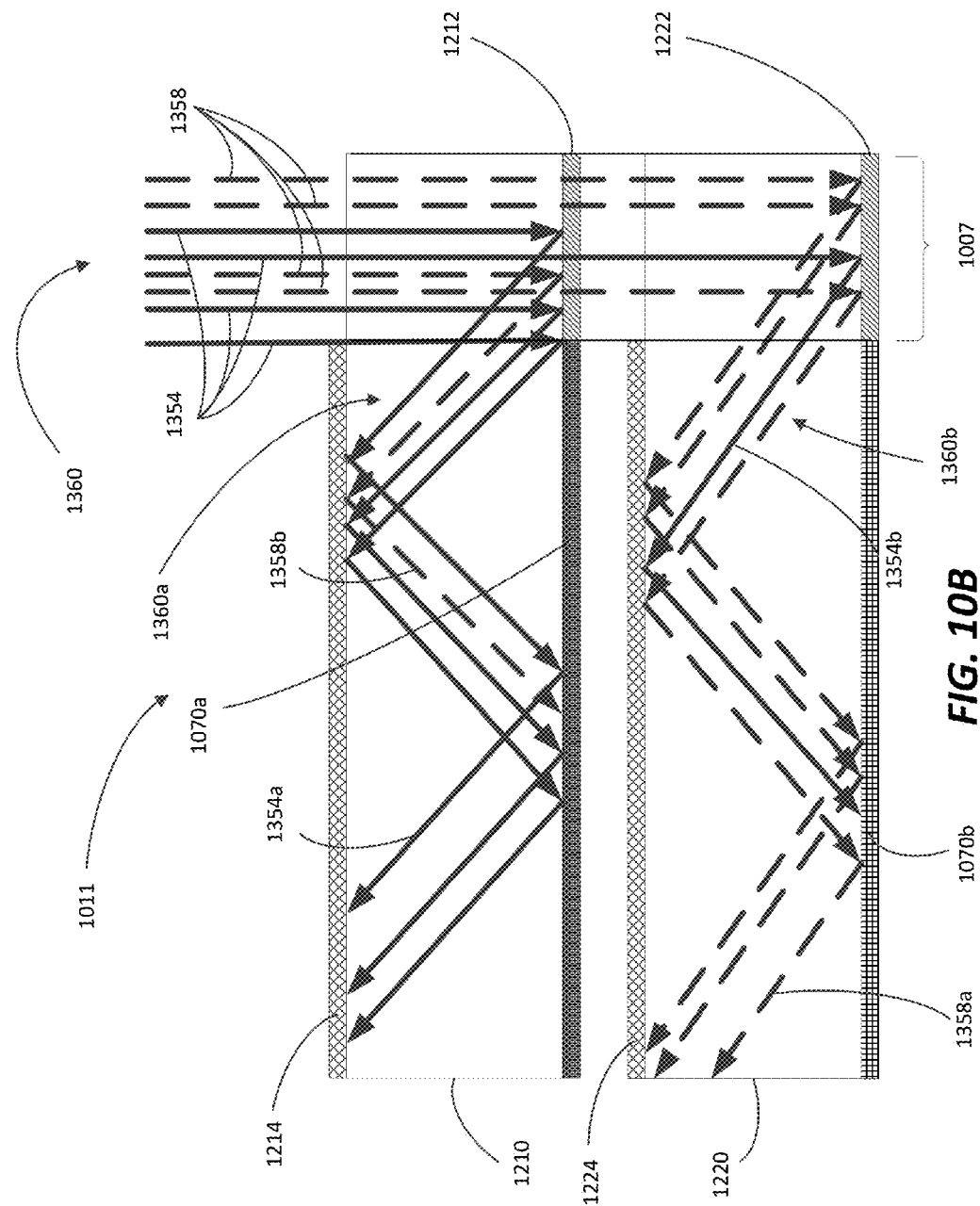
FIG. 10B is a side view that schematically illustrates an example display where two waveguides include distributed switch materials.

FIG. 10B schematically illustrates a side view of an example display where two waveguides 1210, 1220 include distributed switch materials 1070*a*, 1070*b*. The number of waveguides in a given embodiment could be greater or fewer than two. In certain embodiments, the waveguides 1210, 1220 include distributed filter and/or switch material, such as switch materials 1070*a*, 1070*b*. Examples of switch materials include dichroic filters, electronically switchable glass, and electronically switchable mirrors. The switch materials 1070*a*, 1070*b* can be electronically switched to modify, e.g., the brightness, polarization, angle of reflection, or angle of refraction of light. Some switch materials may also include electrochromic, photochromic, thermochromic, suspended particle, or micro-blind materials, or polymer dispersed liquid crystals. For example, electrochromic elements may be used to modify the brightness and/or intensity of light. As a further example, a polymer dispersed liquid crystal grating or other tunable grating may be used to modify an angle at which light is propagated through the waveguide. The switch materials can be designed or tuned to attenuate light of unwanted colors or wavelengths. For example, the first switch material 1070*a* may include a filter that attenuates blue light by disrupting the propagation of blue light. As a second example, the first switch material 1070*a* can include a filter that attenuates colors of light that are not blue by disrupting the propagation of the light at those wavelengths. In some embodiments, the switch materials 1070*a*, 1070*b* are electronically switchable to attenuate light when they are switched on and not attenuate light when switched off. The propagation of light may be disrupted, for example, by causing the light to become absorbed, by altering the index of refraction of the material in a way that prevents the light from propagating by total internal reflection, and/or by substantially altering the path angle of the light.

A first switch material 1070*a* may be disposed as a layer on a distal surface of the first waveguide 1210, as shown in FIG. 10B, and/or on a proximal surface of the second waveguide 1220 (e.g., in a stacked waveguide configuration). In some designs, the first switch material 1070*a* is disposed on a proximal surface of the first waveguide 1210. As shown, the first switch material 1070*a* may be disposed parallel to the proximal surface of the waveguide. In some designs, the first switch material 1070*a* is oriented at an angle relative to the distal and/or proximal surface of the waveguide 1210. The first switch material 1070*a* may be disposed within the volume of the first waveguide 1210. For example, the switch material may disposed along a plane intersecting one or more surfaces of the first waveguide 1210 and/or or may be disposed volumetrically (e.g., throughout the whole volume) in the first waveguide material (e.g., mixed and/or patterned into the first waveguide material). The first switch material 1070*a* may include a material that alters the index of refraction and/or absorption of light for certain ranges of wavelengths.

As illustrated by FIG. 10B, the first switch material may be disposed along a plane perpendicular to entering light rays 1360 and/or parallel to the first layer of the incoupling optical element 1212. In some designs, the first switch material is disposed along two or more surfaces of the first waveguide 1210, such as, for example, adjacent surfaces and/or opposite surfaces (e.g., proximal and distal surfaces).

Distributed switch materials may be used to steer a beam (e.g., before being outcoupled by the outcoupling optical element). Beam steering may allow expanding the field of view of a user. In some examples, a polymer dispersed liquid crystal grating or other tunable grating may be implemented as distributed switch materials and used to perform beam steering by modifying an angle of TIR waveguided light, an angle at which light is outcoupled by the outcoupling optical element, or a combination thereof. Switch materials can be used to modulate light received from upstream components (e.g., light source, LCoS). Different waveguides or layers of the light distributing element may be independently electronically switched (e.g., by the controller 210). For example, it may be advantageous to modulate light in one waveguide while allowing light in a second waveguide to propagate unmodulated. Thus, in some embodiments, modulation processes that are typically performed by the upstream components can be performed at the waveguide stack through strategic control of the distributed switches. Accordingly, outcoupling can be enabled or disabled on a waveguide-by-waveguide basis by controlling the associated distributed switches.

In some embodiments, one or more metasurfaces (e.g., made from metamaterials) may be used for beam control (e.g., beam steering). Further information on metasurfaces and metamaterials that may be used as distributed switch materials in various embodiments of this disclosure can be found in U.S. Patent Publication No. 2017/0010466 and/or U.S. Patent Publication No. 2017/0010488, both of which are hereby incorporated by reference herein in their entireties.

Figure 11:
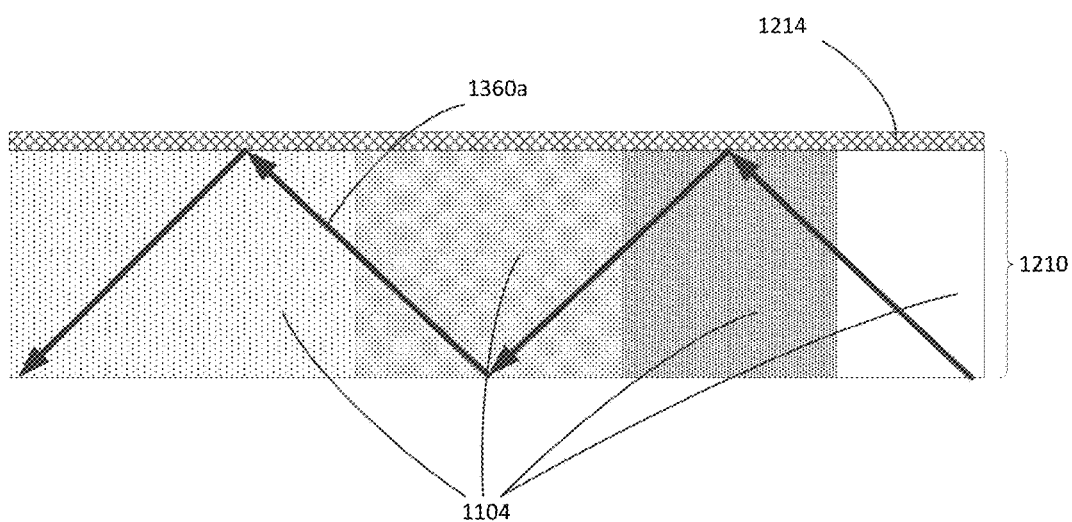
FIG. 11 is a side view that schematically illustrates an example waveguide with multiple filter regions.

FIG. 11 illustrates a schematic of an example waveguide 1210 with multiple filter regions 1104. The filter regions 1104 may be color filters and/or switch materials. Additional wavelength selective filters may also be present in the waveguide 1210. The filter regions 1104 can include any volumetric optical filters as described herein.

Examples of Wavelength Multiplexing Displays

The wavelengths that comprise a light beam can be filtered into a series of waveguides through wavelength multiplexing. Wavelength multiplexing can allow images to be sent to different waveguides simultaneously, e.g., by using or modulating laser diodes at different wavelengths simultaneously. This can result in a simple switching method that addresses different display waveguides. It can enable a rich light field where photons appear to arrive from different depth planes simultaneously.

As described herein, each waveguide in the display can correspond to a particular depth plane of an image. For monochromatic depth planes, only one waveguide may be necessary for the depth plane. However, for depth planes that can create multi-color images, each depth plane can be associated with a stack of waveguides configured to display different colors. For example, each depth plane may include a stack of three waveguides associated with red (R) light, green (G) light, and blue (B) light. To achieve this, it may be desirable to split light into separate colors (e.g., red, green, blue) as well as into subcolors.

Subcolors, as used herein, refer to wavelengths or ranges of wavelengths falling substantially within the range of wavelengths encompassed by the associated color. For example, the green color may span the range of wavelengths from about 495 nm to 570 nm. Thus, the human eye tends to identify as green those wavelengths that contain primarily wavelengths in that range. Continuing with this example, a green subcolor could include a range of wavelengths from 500 nm to 510 nm, from 525 nm to 560 nm, from 555 nm to 560 nm, etc. Humans may see substantially the same color when they view subcolors whose peak intensities are near each other. Subcolors, within a color, have wavelength subranges that are within the wavelength range of the color, and different subcolors have different wavelength subranges that may, or may not, at least partially overlap in wavelength.

Figure 12:
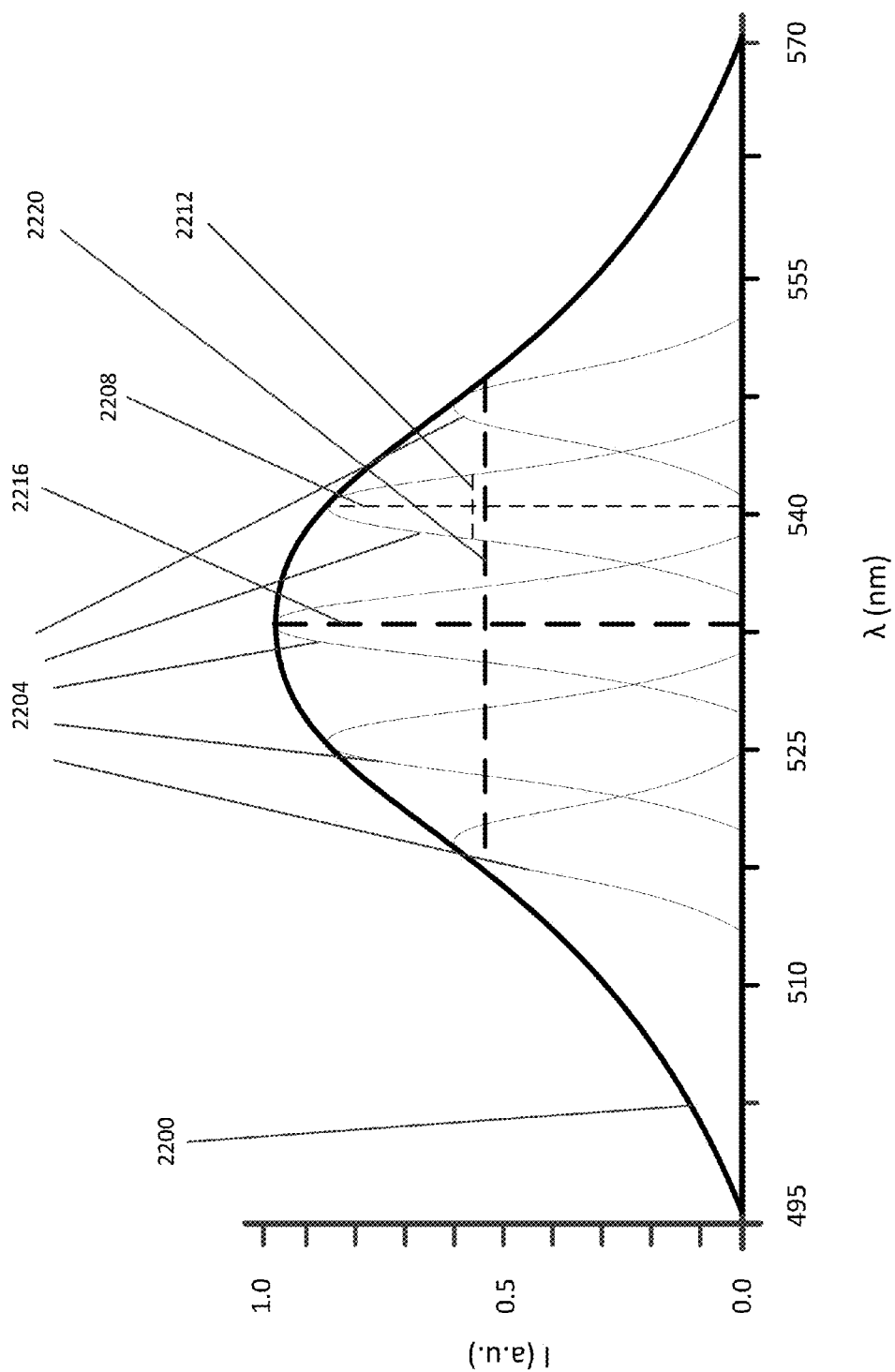
FIG. 12 illustrates an example of a series of subcolors within a color.

FIG. 12 illustrates an example of a series of subcolors 2204 within a color 2200. As shown in FIG. 12, the color 2200 spans wavelengths of approximately 495 nm to 570 nm. For example, this color represents a source of green light with a peak intensity at about 530 nm. The shape and dimensions of the intensity profile for this color is merely an example, and it may take on other shapes and dimensions.

Subcolors 2204 of the color 2200 illustrate examples of other intensity profiles that may still be considered "green" to human observers. The width 2212 of the curve of each subcolor 2204 is narrower than that of the color 2200. Each subcolor 2204 can have a width 2212 and a peak wavelength 2208, but for clarity the width 2212 and peak wavelength 2208 are not labeled for each subcolor. The width 2212 of each subcolor can be represented by, e.g., the full width at half maximum (FWHM). The distance between peak wavelengths 2208 of each subcolor 2204 can be between about 1-120 nm. In some embodiments, the distance between peak wavelengths can be in a range of about 10-80 nm. In some embodiments, the distance between peak wavelengths can be between about 15-50 nm. The width 2212 of each subcolor 2204 can be between about 3-35 nm, between about 5-55 nm, less than 20 nm, less than 30 nm, less than 40 nm, or some other width. The number and widths of subcolors can be selected based on the multiplexing properties of the display device.

With continued reference to FIG. 12, the color 2200 approximates a Gaussian curve, though other curves and beam profiles are possible. As shown in FIG. 12, the color 2200 can be described by its peak wavelength 2216 and width 2220 (e.g., a full-width at half maximum (FWHM)). The width 2216 can vary according to different embodiments. For example, the width 2216 can range between about 40-220 nm. In some embodiments, the width can range between about 15-120 nm, between about 60-160, between about 45-135 nm, less than 10 nm, or greater than 175 nm.

Some embodiments permit the use of color ranges outside the visible spectrum (e.g., ultraviolet, infrared). In part for that reason, it can make sense to describe the relationship of the widths of the colors to the subcolors in various embodiments. For example, in some embodiments the ratio of the width 2216 of a color to the width 2208 of a subcolor can be in a range from about 2 to 5. In some embodiments, this ratio can be between about 4-12, between about 10-25, be less than 2, or be greater than 25.

References to a given color or color of light throughout this disclosure encompass light of one or more wavelengths within a range of wavelengths of light that are perceived by a viewer as being of that given color. For example, red light may include light of one or more wavelengths in the range of about 620-780 nm, green light may include light of one or more wavelengths in the range of about 495-570 nm, and blue light may include light of one or more wavelengths in the range of about 435-495 nm. The waveguides described herein can be configured to operate on wavelength bands outside the visual, e.g., infrared or ultraviolet. The term "wavelength" can mean "a single wavelength" or "a range of wavelengths" in various implementations.

Figure 13:
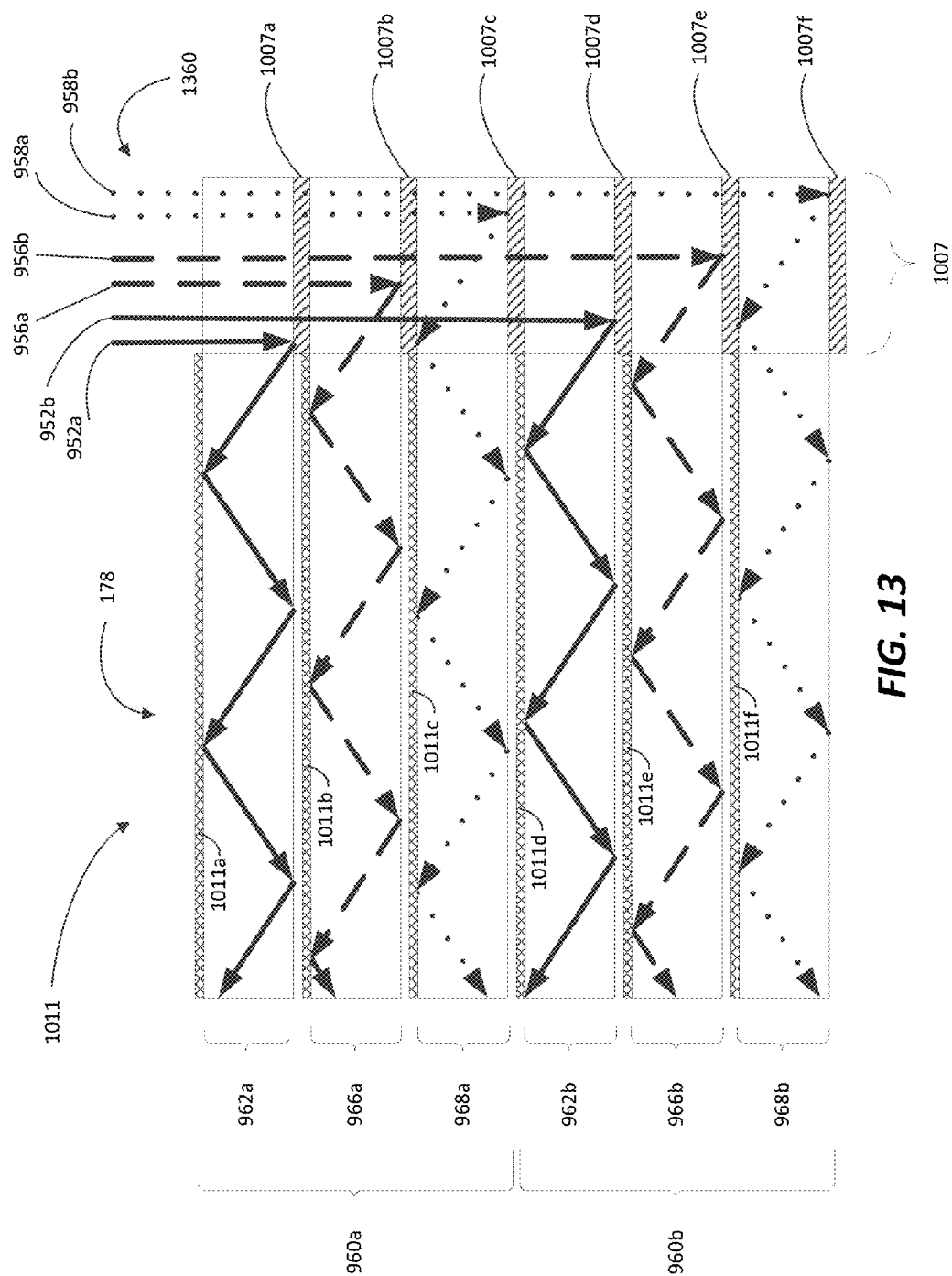
FIG. 13 schematically illustrates a side view of an example stacked waveguide assembly.

FIG. 13 schematically illustrates a side view of an example stacked waveguide assembly 178. FIG. 13 shows two waveguide stacks 960a, 960b. There can be more than two waveguide stacks in other implementations. As shown in FIG. 13, each waveguide stack 960a, 960b includes three waveguides, but the waveguide stacks 960a, 960b may comprise one, two, four, or more waveguides and is not limited by the illustration in FIG. 13. Each waveguide stack 960a, 960b may produce a different depth plane 306, as shown in FIG. 3.

In some embodiments, the waveguide stacks 960a, 960b may each be associated with a particular depth plane in a light field display. For example, the waveguide stack 960a may be used to display images perceivable at a first distance from the wearer, and the waveguide stack 960b may be used to display images perceivable at a second distance from the wearer, where the second distance is different from the first distance. Each waveguide stack 960a, 960b can be designed to display one or more colors. In the example shown in FIG. 13, each stack 960a, 960b includes three waveguides for three different colors (e.g., red, green, and blue).

As shown in FIG. 13, each waveguide stack may be associated with particular subcolors. For example, the first waveguide stack 960a may be associated with a first subcolor of three different colors, e.g., blue, green, and red. As depicted in FIG. 13, a first pair of light rays 952a, 952b can represent two subcolors of the same color. For example, the first pair of light rays 952a, 952b may represent light at two subcolors of blue, such as 440 nm and 450 nm light.

Each waveguide in the stacked waveguide assembly 178 can be configured to receive light at a particular design wavelength. Generally, the design wavelength corresponds to a particular subcolor. As illustrated in FIG. 13, each waveguide 962a, 966a, 968a, 962b, 966b, 968b can comprise a corresponding incoupling optical element 1007a, 1007b, 1007c, 1007d, 1007e, 1007f. The incoupling optical element 1007 comprises the incoupling optical elements 1007a, 1007b, 1007c, 1007d, 1007e, 1007f. Each incoupling optical element 1007a, 1007b, 1007c, 1007d, 1007e, 1007f can be configured to deflect a design wavelength into the corresponding waveguide 962a, 966a, 968a, 962b, 966b, 968b.

With reference to the waveguide stacks shown in FIG. 13, it can be challenging to propagate light of the right color to the right color plane in the right depth plane. For example, the display may attempt to show a blue object that is at a particular depth from the viewer of the display. In FIG. 13, rays 952a and 952b may represent the propagation of blue light. If a fraction of the blue light (e.g., the ray 952a) that should be displayed at a first depth plane (e.g., 960a) is misdirected to a different depth plane (e.g., 960b), then the resulting image displayed to a viewer of the waveguide 905 will not accurately reflect the depth of the blue object in the image. Similarly, if a fraction of the blue light that should be displayed at a blue color layer (e.g., layer 962a) in the waveguide stack 960a is misdirected to a red or green layer (e.g., layers 966a, 968a), then the color of the blue object will not be accurately displayed to the viewer. One possible reason for the misdirection of light of a particular color to a "wrong" layer is that diffraction gratings, which may be used to diffract the light from an incident direction (e.g., downward as shown in FIG. 13) to a propagation direction in the waveguide layer (e.g., horizontal as shown in FIG. 13), are not 100% efficient. Moreover, optical gratings often diffract light having wavelengths across a broad spectrum and may affect light of wavelengths that were not intended. For example, gratings tuned to diffract light of one color (e.g., red) may diffract light of other colors (e.g., blue or green). Therefore, for example, a small fraction of the light in the ray 952a, which should be directed by the incoupling optical element 1007a into the layer 926a, may pass through the incoupling optical element 1007a and be directed into one (or more) of the other layers of the waveguide. Similar considerations apply for green or red light input into the incoupling optical element 1007.

Accordingly, certain embodiments of the display use a wavelength multiplexing technique to direct light to the appropriate layer in the waveguide. For example, the wavelengths used for blue light rays 952a and 952b may be slightly different from each other and represent different subcolors of the color blue. Similarly, the wavelengths used for green light rays 956a and 956b may be slightly different from each other and represent different subcolors of the color green. Finally, the wavelengths used for red light rays 958a and 958b may be slightly different from each other and represent different subcolors of the color red. The incoupling optical elements 1007a-1007f can be configured to strongly re-direct light of the appropriate wavelength into the corresponding layer in the waveguide assembly. Light that passes through the incoupling element will have a much lower likelihood of being misdirected by a different incoupling element, because the different element is configured to re-direct a different range of wavelengths.

For example, the blue light ray 952a can be centered at a range of wavelengths around 435 nm (e.g., a first blue subcolor), while the blue light ray 952b can be centered at a different range of wavelengths around 445 nm (e.g., a second blue subcolor). The incoupling optical element 1007a can be configured to re-direct blue light of the first blue subcolor, while the incoupling optical element 1007d can be configured to re-direct blue light of the second blue subcolor. In this way, the blue light ray 952a is preferentially re-directed into the layer 962a, while the blue light ray 952b is preferentially re-directed into the layer 962b. Similar considerations apply to the use of different green subcolors for the green light rays 956a, 956b and different red subcolors for the red light rays 958a, 958b.

The foregoing is merely an example, and as shown in FIG. 12, many different subcolors of a particular color can be used to multiplex light of that color into the appropriate layers of the waveguide 905. The width of the wavelength range of a subcolor can be selected so that the incoupling optical element can efficiently redirect the subcolor into the appropriate layer. Likewise, the properties of the incoupling optical element (e.g., a diffractive grating period) can be selected to efficiently re-direct light of the appropriate subcolor.

With further reference to FIG. 13, the first waveguide stack 960a can couple a first subcolor of three colors, such as blue, green, and red. Similarly, the second waveguide stack 960b can couple a second subcolor of the three colors. For example, the first waveguides 962a, 962b of each stack can be configured to receive the first and second subcolors of a first color, such as blue. Similarly, the second waveguides 966a, 966b of each stack can be configured to receive the first and second subcolors of a second color, such as green.

In certain embodiments, subcolors of the same color may propagate through adjacent waveguides. Such waveguides may form a waveguide stack dedicated to a particular color. For example, a first waveguide may have a first subcolor of blue as a design wavelength and a second waveguide may have a second subcolor of blue as the design wavelength. A third waveguide may have a first subcolor of a second color (e.g., green). Thus, subcolors of a first wavelength (e.g., blue) may be grouped into a first stack of waveguides and subcolors of a second wavelength (e.g., green) may be grouped in a second stack of waveguides.

The number of waveguide stacks can be greater than two, and the number of waveguides within each waveguide stack can be two or greater. Three design wavelength waveguides per waveguide stack are illustrated in FIG. 13 as an example of where one color of each of three primary colors, such as blue, green, and red, are incoupled within each waveguide stack. However, this is not intended to limit the number of waveguides, waveguide stacks, or types of colors that can be incoupled.

Once the light at the color of the corresponding wavelength is incoupled into the corresponding design wavelength waveguide and out of the incoupling optical element 980, the light propagates through the corresponding waveguide 962a, 966a, 968a, 962b, 966b, 968b. Along the optical path of the light at the design wavelength is a corresponding light distributing element 1011a, 1011b, 1011c, 1011d, 1011e, 1011f. The corresponding light distributing element 1011a, 1011b, 1011c, 1011d, 1011e, 1011f can deflect the light at the corresponding design wavelength to a corresponding layer of the outcoupling optical element (not shown). The corresponding layer of the outcoupling optical element is configured to couple the light at the corresponding design out of the stacked waveguide assembly.

Figure 14:
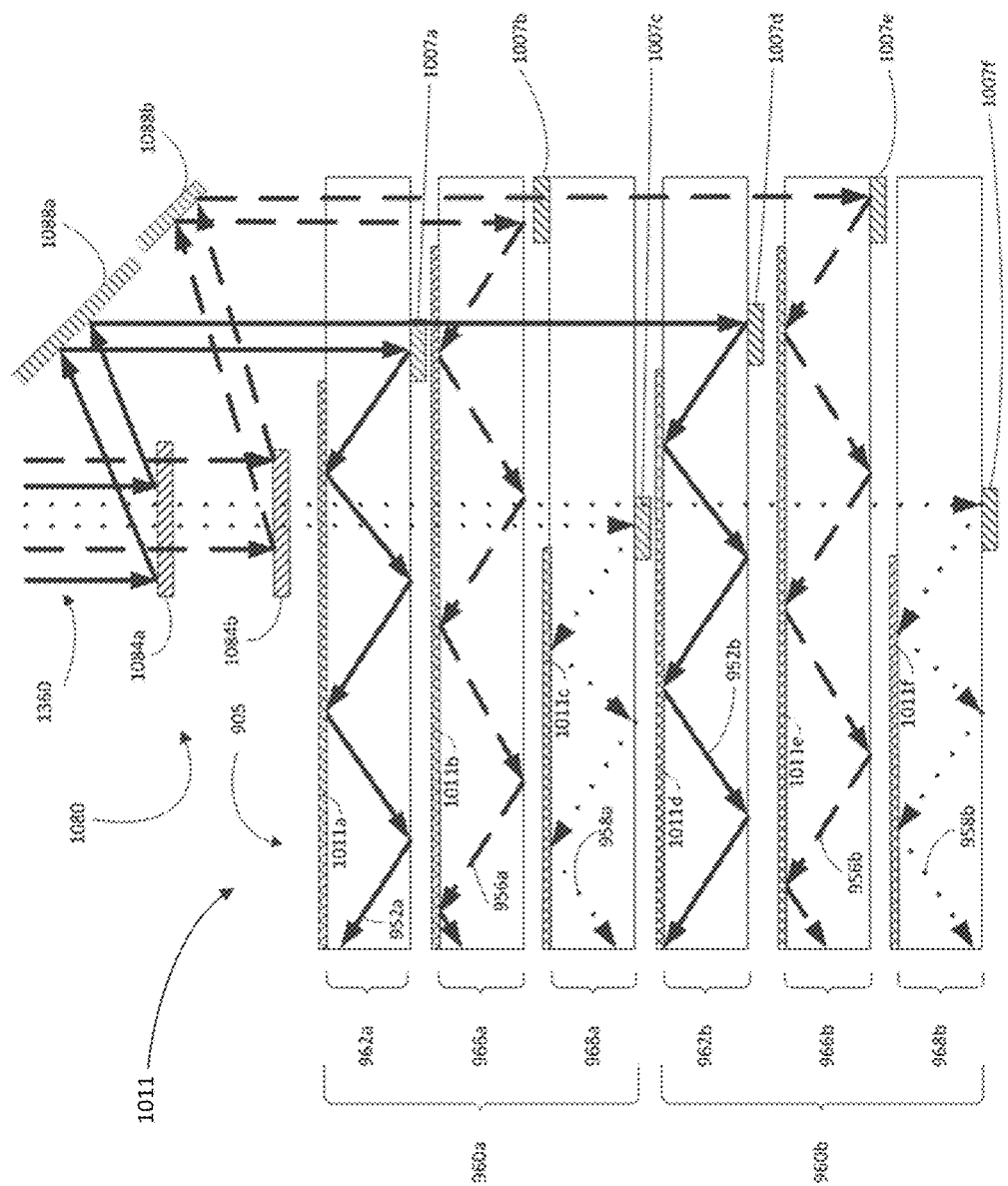
FIG. 14 schematically illustrates a side view of an example stacked waveguide assembly with a preliminary light filter system.

FIG. 14 schematically illustrates a side view of an example stacked waveguide assembly 178 with a preliminary light filter system 1080. The preliminary light filter 1080 can be used to provide a first-order color selection process. The preliminary light filter system 1080 can comprise a number of optical elements 1084a, 1084b, 1088a, 1088b, such as gratings, mirrors, prisms, and other refractive and/or reflective elements. The filter system 1080 may include diffractive optical elements as well. The precise number and configuration of the optical elements is shown here by way of example only and may be changed as necessary. The filter system 1080 can be used to direct light of different wavelengths to different color layers or depth planes of the waveguide 905.

Figure 15A:
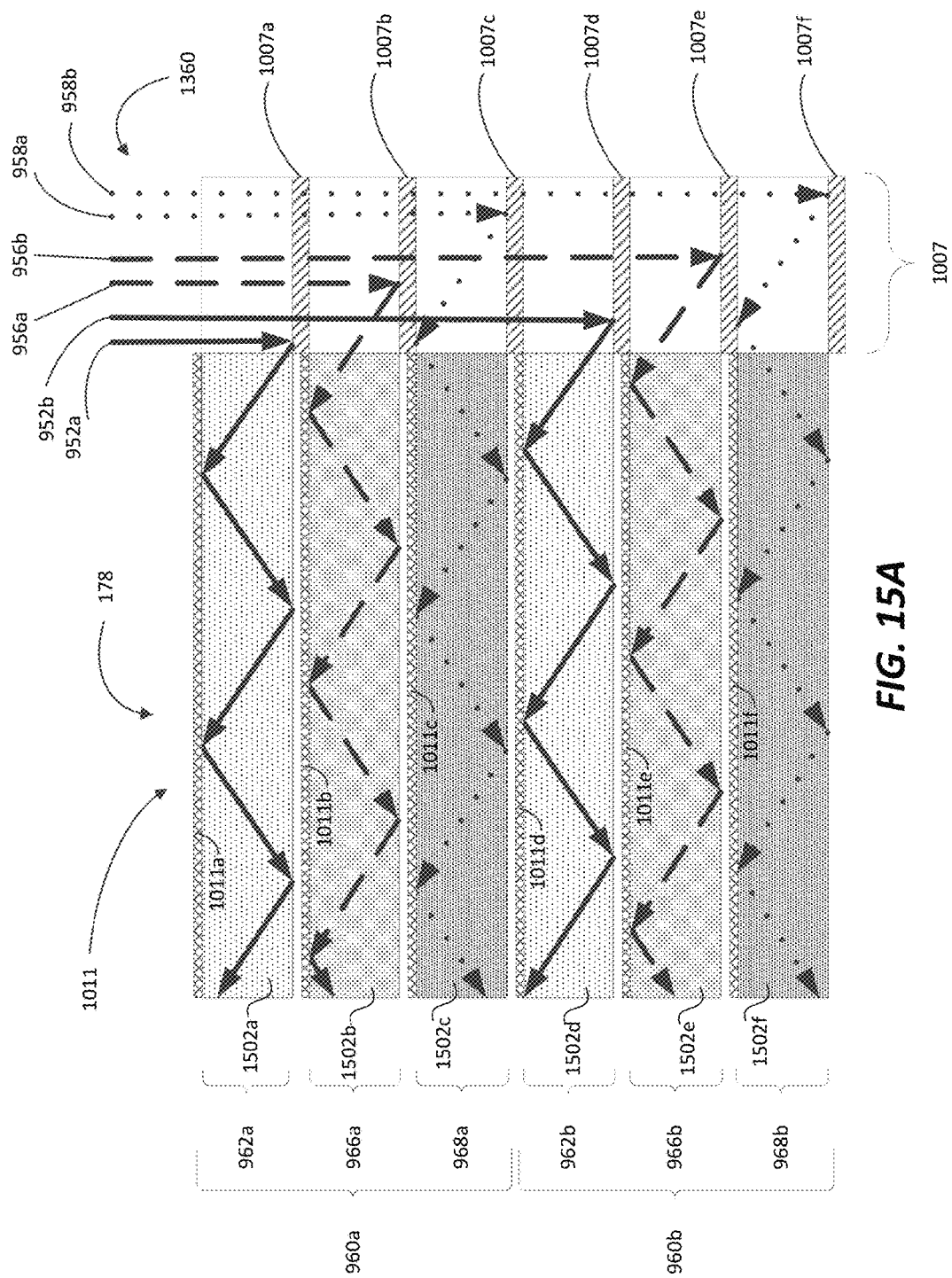
FIG. 15A shows an example of the waveguide assembly of FIG. 13 with distributed filters.

Examples of Display Systems with Wavelength Multiplexing and Wavelength Selective Filtering Features of both wavelength multiplexing and wavelength selective filters may be included in a waveguide display system. A wavelength multiplexing waveguide assembly can include one or more wavelength selective filters. FIG. 15A shows the waveguide assembly 178 of FIG. 13 with distributed filters 1502a, 1502b, 1502c, 1502d, 1502e, 1502f. The distributed filters can include any optical filter described herein, such, for example, an absorptive filter, a refractive filter, a diffractive filter, and/or a reflective filter. The optical filter may be a color filter (e.g., selecting for a specific range of wavelengths). Examples of absorptive filters include tints, dyes, or stains. Refractive filters include optical elements that filter based on different indices of refraction for different wavelengths of light. Examples of diffractive filters include gratings. Examples of reflective filters include dichroic mirrors. The optical filter may include a polarizer. Thus, the waveguides 962a-968a (and the waveguides 962b-968b) can perform color (or subcolor) filtering as described with reference to FIG. 10A. The incoupling optical element 1007 may perform less wavelength filtering in such embodiments, because the corresponding waveguides include a distributed filter that can provide some or all of the wavelength filtering.

Figure 15B:
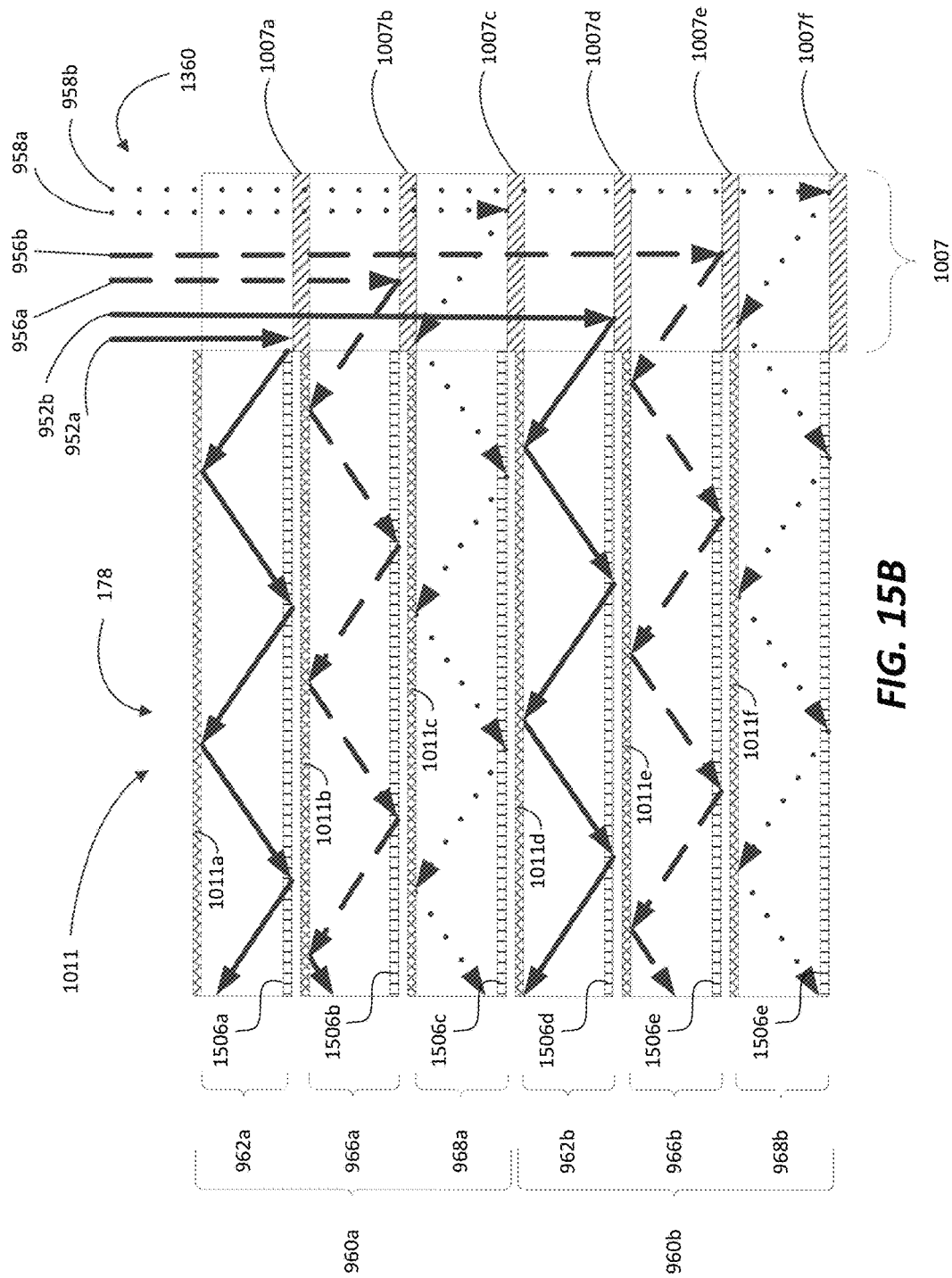
FIG. 15B shows an example of the waveguide assembly of FIG. 13 with distributed switches.

FIG. 15B shows the waveguide assembly 178 of FIG. 13 with distributed switches 1506a, 1506b, 1506c, 1506d, 1506e, 1506f. The distributed switches may include any filter described herein. Distributed switches may include an electrically switchable layer and/or an electrically switchable volume. Examples of electrically switchable materials include switchable dichroics, switchable mirrors, switchable gratings, switchable holograms, switchable glasses, and switchable polarizers. The distributed switches may include polymer dispersed liquid crystal or other liquid crystal assemblies (e.g., liquid crystal on silicon (LCoS)). As further described elsewhere herein, the switchable material can be switched to alter a reflective, absorptive, refractive, diffractive, and/or polarizing quality of the material. For example, an electrical signal may cause the material to attenuate (e.g., absorb, deflect away) red light while propagating blue light (e.g., via TIR). As a further example, a polarizer may be configured to turn on or off based on an electrical signal. For example, a polarizer may include a cholesteric liquid crystal element. Other configurations are also possible.

As shown by FIG. 15B, distributed switches 1506a, 1506b, 1506c, 1506d, 1506e, 1506f may be disposed along a surface of corresponding waveguides 962a, 966a, 968a, 962b, 966b, 968b. Such a surface may be a distal surface from the incoming light 1360 as shown in FIG. 15B, but other surfaces (e.g., a proximal surface to the light 1360, a surface perpendicular to the proximal surface) are also possible. In some embodiments, the switchable material is disposed throughout the volume (e.g., volumetrically) of the corresponding waveguides. A switchable layer may be disposed within the corresponding waveguide along a plane that is not parallel to any surface of the waveguide. For example, a switchable material may be disposed on a layer not coplanar with a surface of the waveguide. In some embodiments, the waveguide assembly 178 can include a combination of both distributed filters 1502a-1502f and distributed switches 1506a-1506f.

Waveguide assemblies 178 such as the examples shown in FIGS. 15A and 15B can utilize the distributed filters 1502a-1502f or the distributed switches 1506a-1506f to perform subcolor filtering within one or more waveguides 962a-968b. In this way, the incoupling optical element 1007 may be less wavelength selective than in the waveguide assembly embodiments 178 that use only one or the other of distributed filtering or distributed switching, which advantageously may reduce degradation along the optical path that passes through each waveguide in the stack.

Example Color Gamuts

Figure 16:
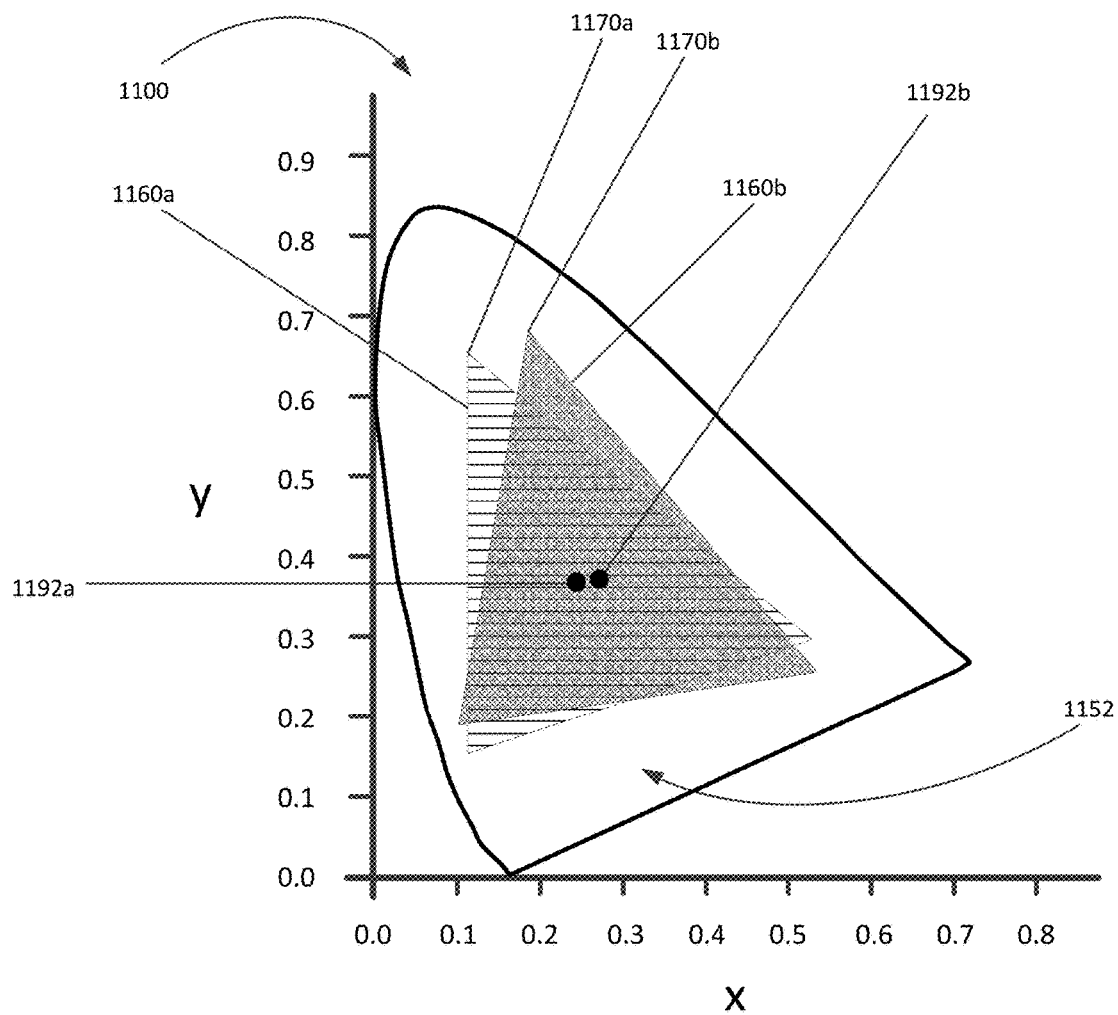
FIG. 16 is a chromaticity diagram describing the hypothetical human visual response gamut at which colors are perceived.

FIG. 16 is an International Commission on Illumination (CIE) chromaticity diagram 1100 with x-y axes (e.g., normalized tristimulus values) describing the hypothetical human visual response gamut 1152 at which colors are perceived. Each waveguide stack 960a, 960b can represent colors in a corresponding color gamut, 1160a, 1160b, which is typically smaller than the entire gamut 1152 of all perceivable colors. The vertices of each gamut 1160a, 1160b correspond to the colors of the corresponding waveguides in each stack. For example, the gamut 1160a for the waveguide stack 960a has vertices corresponding to the colors propagated by the waveguides 962a, 966a, and 968a, and the gamut 1160b for the waveguide stack 960b has vertices corresponding to the colors propagated by the waveguides 962b, 966b, and 968b. Each gamut 1160a, 1160b has an associated white point 1192a, 1192b (near the center of each gamut) that represents the chromaticity of white.

As can be seen from FIG. 16, the gamuts 1160a, 1160b substantially overlap so that each of the waveguide stacks 960a, 960b presents substantially the same range of colors to the wearer of the display. However, as described above, the corresponding vertices of each gamut are slightly shifted relative to each other, due to the wavelength multiplexing. For example, the vertex 1170a of the gamut 1160a for the waveguide stack 960a may represent green light near 520 nm whereas the vertex 1170b of the gamut 1160b for the waveguide stack 960b may represent green light near 530 nm.

Colors falling within both color gamuts 1160a, 1160b can be produced by mixing colors associated with the vertices defining either the first color gamut 1160a or the second color gamut 1160b. To produce a given color, the proportion that is needed of each vertex wavelength from the first color gamut 1160a may be different from the proportions needed from the vertices of the second color gamut 1160b.

In some embodiments, the wavelengths corresponding to the vertices of the color gamuts 1160a, 1160b are selected so that the white points 1192a, 1192b remains substantially the same. For example, the color difference between the white points 1192a and 1192b may be less than about the just noticeable difference (JND) in the color space (e.g., less than about 2.3 in certain CIE color spaces). In other embodiments, the wavelengths corresponding to the vertices can be selected such that both color gamuts 1160a, 1160b include the white points 1192a, 1192b. In these embodiments, the wavelengths at the vertices are not fully determined by the white points 1192a, 1192b.

Although FIG. 16 is shown with two color gamuts 1160a, 1160b, this is for illustrative purposes and is not a limitation. In general the number of gamuts will be equal to the number of waveguide stacks in the display, and the multiplexing wavelengths of each of the stacks can be selected so that the corresponding white point for each stack is substantially equal to the white points of the other waveguide stacks.

Example Aspects

In a first Aspect, a waveguide comprising an incoupling optical element configured to couple light into the waveguide, the light comprising a first wavelength and a second wavelength not equal to the first wavelength; a light distributing element configured to receive light from the incoupling optical element, the light distributing element comprising a wavelength selective region configured to attenuate incoupled light at the second wavelength relative to incoupled light at the first wavelength; and an outcoupling optical element configured to receive light from the light distributing element and to couple light at the first wavelength out of the waveguide.

In a second Aspect, the waveguide of Aspect 1, wherein the incoupling optical element comprises a grating.

In a third Aspect, the waveguide of any of Aspects 1-2, wherein the wavelength selective region comprises a color filter.

In a fourth Aspect, the waveguide of Aspect 3, wherein the color filter comprises a dye, a tint, a stain, a dichroic filter, or a Bragg grating.

In a fifth Aspect, the waveguide of any of Aspects 1-4, wherein the incoupling optical element does not comprise a dye, a tint, a stain, a dichroic filter, or a Bragg grating.

In a sixth Aspect, the waveguide of any of Aspects 1-5, wherein the outcoupling optical element does not comprise a dye, a tint, a stain, a dichroic filter, or a Bragg grating.

In a seventh Aspect, the waveguide of any of Aspects 1-6, wherein the wavelength selective region comprises an electronically switchable region.

In an eighth Aspect, the waveguide of any of Aspects 1-7, wherein the wavelength selective region comprises a polymer dispersed liquid crystal grating.

In a ninth Aspect, the waveguide of any of Aspects 1-8, wherein the incoupling optical element, the light distributing element, or the outcoupling optical element includes a diffractive optical element.

In a tenth Aspect, the waveguide of Aspect 9, wherein the diffractive optical element comprises an analog surface relief grating (ASR), a binary surface relief structure (BSR), a hologram, or a switchable diffractive optical element.

In an eleventh Aspect, a stacked waveguide assembly comprising a first waveguide of any of Aspects 1-10, wherein the incoupled light at the second wavelength is attenuated relative to the incoupled light at the first wavelength; and a second waveguide of any of Aspects 1-10, wherein the incoupled light at the first wavelength is attenuated relative to the incoupled light at the second wavelength.

In a twelfth Aspect, a stacked waveguide assembly comprising a first waveguide comprising a first incoupling optical element configured to incouple light at a first wavelength and to couple light not at the first wavelength out of the first waveguide; a first wavelength selective region configured to receive incoupled light from the first incoupling optical element and to propagate the incoupled light to a first light distributing element, wherein the first wavelength selective region is configured to attenuate the incoupled light not at the first wavelength relative to incoupled light at the first wavelength, and wherein the first light distributing element is configured to couple the incoupled light at the first wavelength out of the first wavelength selective region; and a first outcoupling optical element, configured to receive the incoupled light at the first wavelength from the first light distributing element and to couple the incoupled light not at the first wavelength out of the first waveguide. The stacked waveguide assembly comprises a second waveguide comprising a second incoupling optical element, configured to receive incident light at a second wavelength different from the first wavelength from the first incoupling optical element, to couple incident light not at the second wavelength out of the second waveguide, and to incouple the incident light at the second wavelength; a second wavelength selective region configured to receive incoupled light from the second incoupling optical element and to propagate the incoupled light to a second light distributing element, wherein the second wavelength selective region is configured to attenuate the incoupled light not at the second wavelength relative to incoupled light at the second wavelength, and wherein the second light distributing element is configured to couple the incoupled light at the second wavelength out of the second wavelength selective region; and a second outcoupling optical element, configured to receive the incoupled light at the second wavelength from the second light distributing element and to couple the incoupled light not at the second wavelength out of the second waveguide.

In a thirteenth Aspect, the stacked waveguide assembly of Aspect 12, wherein the incoupling optical element, the light distributing element, or the outcoupling optical element includes a diffractive optical element.

In a fourteenth Aspect, the stacked waveguide assembly of Aspect 13, wherein the diffractive optical element comprises an analog surface relief grating (ASR), a binary surface relief structure (BSR), a hologram, or a switchable diffractive optical element.

In a fifteenth Aspect, the stacked waveguide assembly of any of Aspects 12-14, wherein the wavelength selective region comprises a color filter.

In a sixteenth Aspect, the stacked waveguide assembly of Aspect 15, wherein the color filter comprises a dye, a tint, a stain, a dichroic filter, or a Bragg grating.

In a seventeenth Aspect, the stacked waveguide assembly of any of Aspects 12-16, wherein the incoupling optical element does not comprise a dye, a tint, a stain, a dichroic filter, or a Bragg grating.

In a eighteenth Aspect, the stacked waveguide assembly of any of Aspects 12-17, wherein the outcoupling optical element does not comprise a dye, a tint, a stain, a dichroic filter, or a Bragg grating.

In a nineteenth Aspect, the stacked waveguide assembly of any of Aspects 12-18, wherein the wavelength selective region comprises an electronically switchable region.

In a twentieth Aspect, the stacked waveguide assembly of any of Aspects 12-19, wherein the wavelength selective region comprises a polymer dispersed liquid crystal grating.

In a twenty-first Aspect, a method of displaying an optical image, the method comprising incoupling light having a first wavelength and a second wavelength different from the first wavelength into a stacked waveguide assembly comprising a first waveguide and a second waveguide, the first waveguide comprising a first wavelength selective region and a first outcoupling optical element, and the second waveguide comprising a second wavelength selective region and a second outcoupling optical element; selectively attenuating the incoupled light at the second wavelength relative to the first wavelength in the first wavelength selective region; selectively attenuating the incoupled light at the first wavelength relative to the first wavelength in the second wavelength selective region; coupling the incoupled light at the first wavelength to the first outcoupling optical element; coupling the incoupled light at the first wavelength to the second outcoupling optical element; and coupling the incoupled light at the first wavelength and the second wavelength out of the stacked waveguide assembly.

In a twenty-second Aspect, a method of displaying an optical image, the method comprising incoupling light having a first wavelength and a second wavelength different from the first wavelength into a waveguide; selectively attenuating the incoupled light at the second wavelength relative to the first wavelength in a first wavelength selective region; selectively attenuating the incoupled light at the first wavelength relative to the second wavelength in a second wavelength selective region; coupling the incoupled light at the first wavelength from a first light distributing element to a first outcoupling optical element; coupling the incoupled light at the second wavelength from a second light distributing element to a second outcoupling optical element; and coupling the incoupled light at the first wavelength and second wavelength out of the outcoupling optical element.

In a twenty-third Aspect, a wearable display system comprising the waveguide of any of Aspects 1-10 or the stacked waveguide assembly of any of Aspects 11-20, wherein the wearable display system can be worn by a user.

In a twenty-fourth Aspect, the wearable display system of Aspect 23, wherein the wearable display system can be mounted on the head of the user.

In a twenty-fifth Aspect, the wearable display system of any of Aspects 23-24, wherein the wearable display system is configured to provide an augmented reality experience for the user.

In a twenty-sixth Aspect, a waveguide comprising an incoupling optical element configured to couple light into the waveguide, the light comprising a first wavelength and a second wavelength not equal to the first wavelength; a light distributing element configured to receive light from the incoupling optical element and to propagate light via total internal reflection, the light distributing element comprising a wavelength selective region configured to attenuate incoupled light at the second wavelength relative to incoupled light at the first wavelength; and an outcoupling optical element configured to receive light from the light distributing element and to couple light at the first wavelength out of the waveguide.

In a twenty-seventh Aspect, the waveguide of Aspect 26, wherein the incoupling optical element comprises a grating.

In a twenty-eight Aspect, the waveguide of Aspect 26, wherein the wavelength selective region comprises a dye, a tint, a stain, a dichroic filter, or a Bragg grating.

In a twenty-ninth Aspect, the waveguide of Aspect 26, wherein the incoupling optical element does not comprise a wavelength selective filter.

In a thirtieth Aspect, the waveguide of Aspect 26, wherein the outcoupling optical element does not comprise a wavelength selective filter.

In a thirty-first Aspect, the waveguide of Aspect 26, wherein the wavelength selective region comprises an electronically switchable region.

In a thirty-second Aspect, the waveguide of Aspect 31, further comprising a controller configured to switch the electronically switchable region between an on state and an off state.

In a thirty-third Aspect, the waveguide of Aspect 26, wherein the wavelength selective region comprises a polymer dispersed liquid crystal grating.

In a thirty-fourth Aspect, the waveguide of Aspect 26, wherein the light distributing element comprises a diffractive optical element.

In a thirty-fifth Aspect, the waveguide of Aspect 34, wherein the diffractive optical element comprises a grating, a hologram, or a switchable diffractive optical element.

In a thirty-sixth Aspect, a stacked waveguide assembly comprising a first waveguide comprising a first layer of an incoupling optical element configured to couple light at a first wavelength into a first layer of a light distributing element, the light distributing element comprising a wavelength selective region; a first layer of the wavelength selective region configured to receive incoupled light from the first layer of the incoupling optical element and to attenuate the incoupled light not at the first wavelength relative to incoupled light at the first wavelength, wherein the first layer of the light distributing element is configured to couple the incoupled light at the first wavelength out of the first layer of the wavelength selective region; and a first layer of an outcoupling optical element configured to receive the incoupled light at the first wavelength from the first layer of the light distributing element and to couple the incoupled light out of the first waveguide; and a second waveguide comprising a second layer of the incoupling optical element configured to couple light at a second wavelength into a second layer of the light distributing element, the second wavelength different from the first wavelength; a second layer of the wavelength selective region configured to receive incoupled light from the second layer of the incoupling optical element and to attenuate the incoupled light not at the second wavelength relative to incoupled light at the second wavelength, wherein the second layer of the light distributing element is configured to couple the incoupled light at the second wavelength out of the second layer of the wavelength selective region; and a second layer of the outcoupling optical element configured to receive the incoupled light at the second wavelength from the second layer of the light distributing element and to couple the incoupled light out of the second waveguide.

In a thirty-seventh Aspect, the stacked waveguide assembly of Aspect 36, wherein the first layer of the wavelength selective region comprises a first color filter and the second layer of the wavelength selective region comprises a second color filter, the first color filter configured to attenuate light at the second wavelength, and the second color filter configured to attenuate light at the first wavelength.

In a thirty-eighth Aspect, the stacked waveguide assembly of Aspect 37, wherein the first color filter or the second color filter comprises a dye, a tint, a stain, a volumetric optical filter, or a dichroic filter.

In a thirty-ninth Aspect, the stacked waveguide assembly of Aspect 36, wherein the first layer of the wavelength selective region comprises a first electronically switchable region, and the second layer of the wavelength selective region comprises a second electronically switchable region.

In a fortieth Aspect, the stacked waveguide assembly of Aspect 39, further comprising a controller configured to electronically control the first electronically switchable region and the second electronically switchable region to modulate light in the stacked waveguide assembly.

In a forty-first Aspect, the stacked waveguide assembly of Aspect 40, wherein the controller is configured to switch the first electronically switchable region to modulate light in the first layer of the light distributing element and to switch the second electronically switchable region to not modulate light in the second layer of the light distributing element.

In a forty-second Aspect, the stacked waveguide assembly of Aspect 40, wherein the controller is configured to electronically control the first electronically switchable region and the second electronically switchable region to steer the incoupled light to expand a field of view.

In a forty-third Aspect, the stacked waveguide assembly of Aspect 36, wherein the first layer of the wavelength selective region is configured to alter an index of refraction of light not at the first wavelength or the second layer of the wavelength selective region is configured to alter an index of refraction of light not at the second wavelength.

In a forty-fourth Aspect, the stacked waveguide assembly of Aspect 36, wherein the first layer or the second layer of the wavelength selective region comprises a polarizer.

In a forty-fifth Aspect, the stacked waveguide assembly of Aspect 36, wherein the first wavelength is associated with a first subcolor of a color and the second wavelength is associated with a second subcolor of the color, the second subcolor different from the first subcolor.

In a forty-sixth Aspect, a display comprising a first waveguide stack comprising a first plurality of waveguides, the first plurality of waveguides comprising a first waveguide configured to propagate light at a first subcolor of a color; a second waveguide stack comprising a second plurality of waveguides, the second plurality of waveguides comprising a second waveguide configured to propagate light at a second subcolor of the color different from the first subcolor; and an incoupling optical system configured to incouple light into the first waveguide stack and the second waveguide stack, the incoupling optical system comprising a first incoupling optical element configured to couple light at the first subcolor into the first waveguide; and a second incoupling portion configured to couple light at the second subcolor into the second waveguide.

In a forty-seventh Aspect, the display of Aspect 46, wherein the first waveguide stack comprises an outcoupling optical element configured to couple light out of the first waveguide stack.

In a forty-eighth Aspect, the display of Aspect 47, wherein the incoupling optical element comprises a diffractive optical element.

In a forty-ninth Aspect, the display of Aspect 48, wherein the diffractive optical element comprises a hologram.

In a fiftieth Aspect, the display of Aspect 46, wherein the waveguide assembly further comprises a preliminary light filter system.

In a fifty-first Aspect, the display of Aspect 50, wherein the preliminary light filter system comprises a grating.

In a fifty-second Aspect, the display of Aspect 46, wherein the first incoupling optical element is configured to transmit light having a peak wavelength different from a peak wavelength of the first subcolor by less than 120 nm.

In a fifty-third Aspect, the display of Aspect 46, wherein the first incoupling optical element is configured to transmit light having a width of a wavelength distribution not greater than about 5-55 nm.

In a fifty-fourth Aspect, the display of Aspects 46, wherein the first incoupling optical element is configured to transmit light having a width of a wavelength distribution profile not greater than about 220 nm.

In a fifty-fifth Aspect, a waveguide assembly comprising a light source that emits light at a plurality of subcolors of a color; and a first waveguide stack configured to incouple light at a first color of the first wavelength and a first color of the second wavelength, the first waveguide stack comprising a first plurality of waveguides, the first plurality of waveguides comprising a first waveguide configured to propagate light at a first subcolor of a color; a second plurality of waveguides, the second plurality of waveguides comprising a second waveguide configured to propagate light at a second subcolor of the color different from the first subcolor; and an incoupling optical system configured to incouple light into the first waveguide stack and the second waveguide stack.

In a fifty-sixth Aspect, a waveguide assembly comprising a first waveguide stack configured to receive light at first and second subcolors, wherein the first and second subcolors are not subcolors of the same color, the first waveguide stack comprising a first waveguide comprising a first grating system configured to incouple light at the first subcolor; and a second waveguide comprising a second grating system, the second waveguide configured to incouple light at the second subcolor, and a second waveguide stack configured to receive light at third and fourth subcolors, wherein the third and fourth subcolors are not subcolors of the same color, the second waveguide stack comprising a third waveguide comprising a third grating system configured to incouple light at the third subcolor; and a fourth waveguide comprising a fourth grating system, the fourth waveguide configured to incouple light at the fourth subcolor.

In a fifty-seventh Aspect, the waveguide assembly of Aspect 56, wherein the first waveguide stack comprises an incoupling optical element.

In a fifty-eighth Aspect, the waveguide assembly of Aspect 57, wherein the light distributing element comprises a diffractive optical element.

In a fifty-ninth Aspect, the waveguide assembly of Aspect 58, wherein the diffractive optical element comprises a grating.

In a sixtieth Aspect, the waveguide assembly of any of Aspects 46-59, wherein the waveguide assembly further comprises a preliminary light filter system comprising a reflective optical element.

In a sixty-first Aspect, a wavelength multiplexing assembly comprising a light source that emits a plurality of subcolors at a first wavelength and a plurality of subcolors at a second wavelength; a first waveguide stack configured to incouple light at a first subcolor of the first wavelength and at a first subcolor of the second wavelength, the first waveguide stack comprising a first waveguide configured to incouple light at the first subcolor of the first wavelength; and a second waveguide configured to incouple light at the second subcolor of the first wavelength; and a second waveguide stack configured to incouple light at a second subcolor of the first wavelength and at a second subcolor of the second wavelength, the first waveguide stack comprising a third waveguide configured to incouple light at the second subcolor of the first wavelength; and a fourth waveguide configured to incouple light at the second subcolor of the second wavelength.

In a sixty-second Aspect, the wavelength multiplexing assembly of Aspect 61, wherein the first waveguide, the second waveguide, the third waveguide, or the fourth waveguide comprises an incoupling optical element, a light distributing element, or an outcoupling optical element.

In a sixty-third Aspect, the wavelength multiplexing assembly of Aspect 62, wherein the incoupling optical element, the light distributing element, or the outcoupling optical element comprises a diffractive optical element.

In a sixty-fourth Aspect, the wavelength multiplexing assembly of Aspect 63, wherein the diffractive optical element comprises a switchable diffractive optical element.

In a sixty-fifth Aspect, the wavelength multiplexing assembly of Aspect 64, wherein the waveguide assembly further comprises a preliminary light filter system comprising a refractive optical element.

CONCLUSION

Each of the processes, methods, and algorithms described herein and/or depicted in the attached figures may be embodied in, and fully or partially automated by, code modules executed by one or more physical computing systems, hardware computer processors, application-specific circuitry, and/or electronic hardware configured to execute specific and particular computer instructions. For example, computing systems can include general purpose computers (e.g., servers) programmed with specific computer instructions or special purpose computers, special purpose circuitry, and so forth. A code module may be compiled and linked into an executable program, installed in a dynamic link library, or may be written in an interpreted programming language. In some implementations, particular operations and methods may be performed by circuitry that is specific to a given function.

Further, certain implementations of the functionality of the present disclosure are sufficiently mathematically, computationally, or technically complex that application-specific hardware or one or more physical computing devices (utilizing appropriate specialized executable instructions) may be necessary to perform the functionality, for example, due to the volume or complexity of the calculations involved or to provide results substantially in real-time. For example, a video may include many frames, with each frame having millions of pixels, and specifically programmed computer hardware is necessary to process the video data to provide a desired image processing task or application in a commercially reasonable amount of time. As another example, the eye-tracking calculations and the application of the appropriate eye-pose-dependent display calibration in real-time typically is performed by application-specific hardware or physical computing devices programmed with specific computer-executable instructions.

Code modules or any type of data may be stored on any type of non-transitory computer-readable medium, such as physical computer storage including hard drives, solid state memory, random access memory (RAM), read only memory (ROM), optical disc, volatile or non-volatile storage, combinations of the same and/or the like. The methods and modules (or data) may also be transmitted as generated data signals (e.g., as part of a carrier wave or other analog or digital propagated signal) on a variety of computer-readable transmission mediums, including wireless-based and wired/cable-based mediums, and may take a variety of forms (e.g., as part of a single or multiplexed analog signal, or as multiple discrete digital packets or frames). The results of the disclosed processes or process steps may be stored, persistently or otherwise, in any type of non-transitory, tangible computer storage or may be communicated via a computer-readable transmission medium.

Any processes, blocks, states, steps, or functionalities in flow diagrams described herein and/or depicted in the attached figures should be understood as potentially representing code modules, segments, or portions of code which include one or more executable instructions for implementing specific functions (e.g., logical or arithmetical) or steps in the process. The various processes, blocks, states, steps, or functionalities can be combined, rearranged, added to, deleted from, modified, or otherwise changed from the illustrative examples provided herein. In some embodiments, additional or different computing systems or code modules may perform some or all of the functionalities described herein. The methods and processes described herein are also not limited to any particular sequence, and the blocks, steps, or states relating thereto can be performed in other sequences that are appropriate, for example, in serial, in parallel, or in some other manner. Tasks or events may be added to or removed from the disclosed example embodiments. Moreover, the separation of various system components in the implementations described herein is for illustrative purposes and should not be understood as requiring such separation in all implementations. It should be understood that the described program components, methods, and systems can generally be integrated together in a single computer product or packaged into multiple computer products. Many implementation variations are possible.

The processes, methods, and systems may be implemented in a network (or distributed) computing environment. Network environments include enterprise-wide computer networks, intranets, local area networks (LAN), wide area networks (WAN), personal area networks (PAN), cloud computing networks, crowd-sourced computing networks, the Internet, and the World Wide Web. The network may be a wired or a wireless network or any other type of communication network.

The systems and methods of the disclosure each have several innovative aspects, no single one of which is solely responsible or required for the desirable attributes disclosed herein. The various features and processes described above may be used independently of one another, or may be combined in various ways. All possible combinations and subcombinations are intended to fall within the scope of this disclosure. Various modifications to the implementations described in this disclosure may be readily apparent to those skilled in the art, and the generic principles defined herein may be applied to other implementations without departing from the spirit or scope of this disclosure. Thus, the claims are not intended to be limited to the implementations shown herein, but are to be accorded the widest scope consistent with this disclosure, the principles and the novel features disclosed herein.

Certain features that are described in this specification in the context of separate implementations also can be implemented in combination in a single implementation. Conversely, various features that are described in the context of a single implementation also can be implemented in multiple implementations separately or in any suitable subcombination. Moreover, although features may be described above as acting in certain combinations and even initially claimed as such, one or more features from a claimed combination can in some cases be excised from the combination, and the claimed combination may be directed to a subcombination or variation of a subcombination. No single feature or group of features is necessary or indispensable to each and every embodiment.

Conditional language used herein, such as, among others, "can," "could," "might," "may," "e.g.," and the like, unless specifically stated otherwise, or otherwise understood within the context as used, is generally intended to convey that certain embodiments include, while other embodiments do not include, certain features, elements and/or steps. Thus, such conditional language is not generally intended to imply that features, elements and/or steps are in any way required for one or more embodiments or that one or more embodiments necessarily include logic for deciding, with or without author input or prompting, whether these features, elements and/or steps are included or are to be performed in any particular embodiment. The terms "comprising," "including," "having," and the like are synonymous and are used inclusively, in an open-ended fashion, and do not exclude additional elements, features, acts, operations, and so forth. Also, the term "or" is used in its inclusive sense (and not in its exclusive sense) so that when used, for example, to connect a list of elements, the term "or" means one, some, or all of the elements in the list. In addition, the articles "a," "an," and "the" as used in this application and the appended claims are to be construed to mean "one or more" or "at least one" unless specified otherwise.

As used herein, a phrase referring to "at least one of" a list of items refers to any combination of those items, including single members. As an example, "at least one of: A, B, or C" is intended to cover: A, B, C, A and B, A and C, B and C, and A, B, and C. Conjunctive language such as the phrase "at least one of X, Y and Z," unless specifically stated otherwise, is otherwise understood with the context as used in general to convey that an item, term, etc. may be at least one of X, Y or Z. Thus, such conjunctive language is not generally intended to imply that certain embodiments require at least one of X, at least one of Y and at least one of Z to each be present.

Similarly, while operations may be depicted in the drawings in a particular order, it is to be recognized that such operations need not be performed in the particular order shown or in sequential order, or that all illustrated operations be performed, to achieve desirable results. Further, the drawings may schematically depict one more example processes in the form of a flowchart. However, other operations that are not depicted can be incorporated in the example methods and processes that are schematically illustrated. For example, one or more additional operations can be performed before, after, simultaneously, or between any of the illustrated operations. Additionally, the operations may be rearranged or reordered in other implementations. In certain circumstances, multitasking and parallel processing may be advantageous. Moreover, the separation of various system components in the implementations described above should not be understood as requiring such separation in all implementations, and it should be understood that the described program components and systems can generally be integrated together in a single software product or packaged into multiple software products. Additionally, other implementations are within the scope of the following claims. In some cases, the actions recited in the claims can be performed in a different order and still achieve desirable results.

What is claimed is:

1. A waveguide assembly comprising:
   a light source configured to emit light at colors corresponding to a plurality of different wavelengths, each wavelength of which falls within one of a plurality of different ranges of wavelengths;
   a first waveguide stack configured to receive light at first and second colors, wherein the first and second colors correspond to wavelengths that do not fall within the same one of the plurality of different ranges of wavelengths, the first waveguide stack comprising:
      a first waveguide comprising a first grating system, the first grating system configured to incouple light at the first color into the first waveguide; and
      a second waveguide comprising a second grating system, the second grating system configured to incouple light at the second color into the second waveguide, and
   a second waveguide stack configured to receive light at third and fourth colors different from the first and second colors, wherein the third and fourth colors correspond to wavelengths that do not fall within the same one of the plurality of different ranges of wavelengths, the second waveguide stack comprising:
      a third waveguide comprising a third grating system, the third grating system configured to incouple light at the third color into the third waveguide; and
      a fourth waveguide comprising-a fourth grating system, the fourth grating system configured to incouple light at the fourth color into the fourth waveguide,
   wherein the first and third colors correspond to wavelengths that fall within the same one of the plurality of different ranges of wavelengths.

2. The waveguide assembly of claim 1, further comprising a preliminary light filter system comprising a reflective optical element.

3. The waveguide assembly of claim 1, wherein the second and fourth colors correspond to wavelengths that fall within the same one of the plurality of different ranges of wavelengths.

4. A wavelength multiplexing assembly comprising:
   a light source that emits light at a plurality of wavelengths falling within a first range of wavelengths and a plurality of wavelengths falling within a second range of wavelengths, the first range of wavelengths corresponding to one of red, green, and blue, and the second range of wavelengths being different from the first range of wavelengths;
   a first waveguide stack configured to incouple light at a first wavelength falling within the first range of wavelengths and at a second wavelength falling within the second range of wavelengths, the first wavelength falling outside of the second range of wavelengths and the second wavelength falling outside of the first range of wavelengths, wherein the first waveguide stack comprises:
      a first waveguide configured to incouple light at the first wavelength; and
      a second waveguide configured to incouple light at the second wavelength; and a second waveguide stack configured to incouple light at a third wavelength falling within the first range of wavelengths and at a fourth wavelength falling within the second range of wavelengths, the third wavelength falling outside of the second range of wavelengths and the fourth wavelength falling outside of the first range of wavelengths, wherein the second waveguide stack comprises:
  a third waveguide configured to incouple light at the third wavelength; and
  a fourth waveguide configured to incouple light at the fourth wavelength.

5. The wavelength multiplexing assembly of claim 4, wherein the first waveguide, the second waveguide, the third waveguide, or the fourth waveguide comprises an incoupling optical element, a light distributing element, or an outcoupling optical element.

6. The wavelength multiplexing assembly of claim 5, wherein the incoupling optical element, the light distributing element, or the outcoupling optical element comprises a diffractive optical element.

7. The wavelength multiplexing assembly of claim 6, wherein the diffractive optical element comprises a switchable diffractive optical element.

8. The wavelength multiplexing assembly of claim 4, wherein the waveguide assembly further comprises a preliminary light filter system comprising a refractive optical element.

* * * * *